(12) United States Patent
Uliyar et al.

(10) Patent No.: US 9,888,364 B2
(45) Date of Patent: Feb. 6, 2018

(54) LOCALIZING A SMARTPHONE IN A MOVING VEHICLE

(71) Applicant: Lightmetrics Technologies Pvt. Ltd., Bangalore (IN)

(72) Inventors: Mithun Uliyar, Bangalore (IN); Ravi Shenoy, Bangalore (IN); Soumik Ukil, Bangalore (IN); Krishna A G, Bangalore (IN); Gururaj Putraya, Bangalore (IN); Pushkar Patwardhan, Bangalore (IN)

(73) Assignee: Lightmetrics Technologies Pvt. Ltd., Bangalore (IN)

( * ) Notice: Subject to any disclaimer, the term of this patent is extended or adjusted under 35 U.S.C. 154(b) by 0 days.

(21) Appl. No.: 15/622,850

(22) Filed: Jun. 14, 2017

(65) Prior Publication Data
US 2017/0366945 A1 Dec. 21, 2017

(30) Foreign Application Priority Data

Jun. 17, 2016 (IN) .............................. 201641020906

(51) Int. Cl.
*H04W 24/00* (2009.01)
*H04W 4/04* (2009.01)
*G01S 5/02* (2010.01)

(52) U.S. Cl.
CPC ........... *H04W 4/046* (2013.01); *G01S 5/0278* (2013.01)

(58) Field of Classification Search
CPC .............................. H04W 4/046; G01S 5/0278
USPC ....... 455/456.1–456.6, 457, 404.2; 701/32.3, 701/32.5, 445, 457, 451.469
See application file for complete search history.

(56) References Cited

U.S. PATENT DOCUMENTS

2015/0300827 A1* 10/2015 Malalur ................. G01C 21/30
701/410
2016/0272196 A1* 9/2016 Hocking ............... B60W 30/02

* cited by examiner

*Primary Examiner* — Wayne Cai
(74) *Attorney, Agent, or Firm* — North Shore Patents, P.C.; Michele Liu Baillie

(57) ABSTRACT

A method and apparatus for localizing a smartphone is disclosed. A plurality of lateral position samples of the smartphone based at least in part on a plurality of location coordinates, lane marking information and accuracy factors of the plurality of location coordinates are collected at a plurality of time instances. Lateral position of the smartphone in the moving vehicle based at least on the plurality of lateral position samples collected at the plurality of time instances is determined. One or more correlations between a vertical acceleration pattern associated with at least one front wheel and a vertical acceleration pattern associated with at least one rear wheel of the moving vehicle passing over one or more road discontinuities as computed from an accelerometer sensor present in the smartphone are determined. Longitudinal position of the smartphone in the moving vehicle based at least on the one or more correlations is determined.

23 Claims, 15 Drawing Sheets

LOCALIZING A SMARTPHONE IN A MOVING VEHICLE

TECHNICAL FIELD

The present disclosure generally relates to field of telematics and, more particularly, to a method and system for localizing a smartphone in a vehicle for identifying driver.

BACKGROUND

Generally, driving behavior of a driver is measured using a combination of key performance indices (KPIs), such as number of harsh braking/accelerations/cornering, frequency of tailgating, frequency of speeding above permissible limits, other traffic violations, and the like measured over a period of time. Oftentimes, such KPIs are used by insurance companies to decide auto insurance premiums of the driver. In order to build the driver risk profile, the driving KPIs are aggregated, a risk profile is estimated and insurance premium is computed based on the quantified riskiness of the driver. In such scenarios, driver identification becomes extremely important as the driving behavior is analyzed on a continuous basis and aggregated. When there are multiple passengers inside a vehicle, it is expedient to identify the person who is driving since the driver KPIs need to be associated with the driver who is driving the vehicle and not the passengers.

Driver identification may be done using data obtained from a variety of modalities such as imaging (camera mounted inside the vehicle), directional audio, providing multiple sensors inside the vehicle, such as accelerometer, gyroscope, and magnetometer and vehicle engine related parameters obtained from on-board diagnostic port and the like. However, such identification techniques require infrastructural modifications in the vehicle, a huge installation cost associated with the same, technical compatibility for receiving data from the vehicle's in-built devices, installation of additional communication devices to send real time data to the insurance companies and the like.

Therefore, there is a need for providing efficient solution to the above mentioned problems related to driver identification. There is a need to provide localization of a smartphone of the driver inside a vehicle and association of the same with one or more deterministic characteristics to evaluate driver behavior for driver identification.

SUMMARY

Various methods, systems and apparatuses for localizing a smartphone in a moving vehicle are provided. The method collects at a plurality of time instances, by a processor, a plurality of lateral position samples of the smartphone based at least in part on a plurality of location coordinates, lane marking information and accuracy factors of the plurality of location coordinates. The method determines, by the processor, lateral position of the smartphone in the moving vehicle based at least on the plurality of lateral position samples collected at the plurality of time instances. The method determines, by the processor, one or more correlations between a vertical acceleration pattern associated with at least one front wheel of the moving vehicle and a vertical acceleration pattern associated with at least one rear wheel of the moving vehicle passing over one or more road discontinuities, the vertical acceleration pattern associated with the at least front wheel and vertical acceleration pattern associated with the at least rear wheel computed from an accelerometer sensor present in the smartphone. The method determines, by the processor, longitudinal position of the smartphone in the moving vehicle based at least on the one or more correlations.

In another embodiment, system for localizing the smartphone in a moving vehicle is provided. The system includes at least one processor and a memory. The memory stores machine executable instructions therein, that when executed by the at least one processor causes the system to collect at a plurality of time instances, a plurality of lateral position samples of the smartphone based at least in part on a plurality of location coordinates, lane marking information and accuracy factors of the plurality of location coordinates. The system is further caused to determine lateral position of the smartphone in the moving vehicle based at least on the plurality of lateral position samples collected at the plurality of time instances. The system is caused to determine one or more correlations between a vertical acceleration pattern associated with at least one front wheel of the moving vehicle and a vertical acceleration pattern associated with at least one rear wheel of the moving vehicle passing over one or more road discontinuities, the vertical acceleration pattern associated with the at least front wheel and vertical acceleration pattern associated with the at least rear wheel computed from an accelerometer sensor present in the smartphone. The system is caused to determine longitudinal position of the smartphone in the moving vehicle based at least on the one or more correlations.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
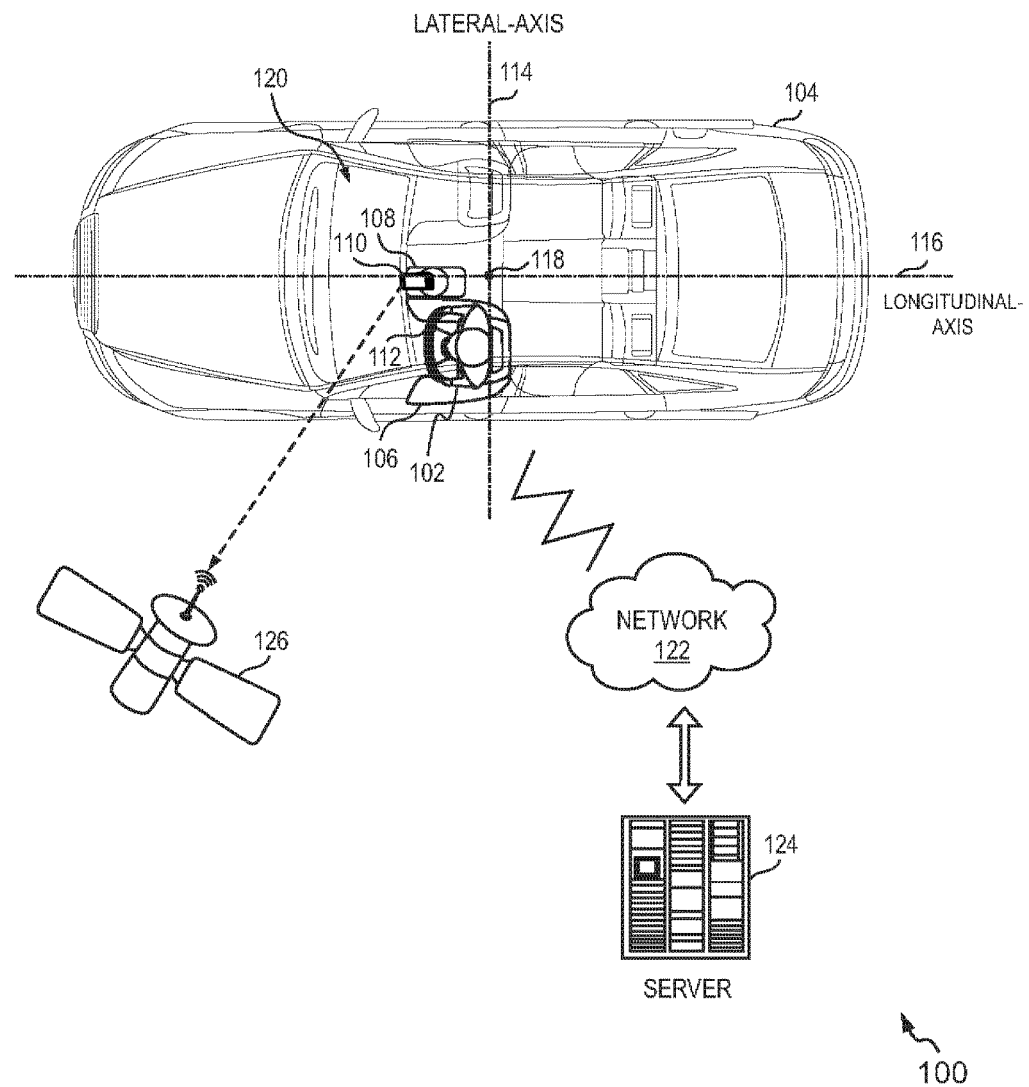
FIG. 1 illustrates an example representation of an environment, where at least some embodiments of the present disclosure may be practiced.

FIG. 1 illustrates an example representation of an environment 100, where at least some embodiments of the present disclosure may be practiced.

The environment 100 includes an example illustration of a driver 102 driving/sitting on a front-left seat 106 of a vehicle 104. Examples of the vehicle 104 may include any vehicle 104 that can ply on the road, for example a car, a bus etc. The vehicle 104 is equipped with a smartphone 110 (hereinafter alternatively referred to as phone). The smartphone 110 is shown lying in a cup holder 108 beside the first-left seat 106. The smartphone 110 may be present at any location in the vehicle 104, for example in a shirt pocket of the driver 102, on a windshield 120 of the vehicle 104 or in a purse of the driver 102 or on lap of the driver 102 or in possession of one or more passengers present in the vehicle 104. In various embodiments, the smartphone 110 may be any portable computing device such as a mobile phone, a PDA (Personal Digital Assistance), a tablet computer, a laptop computer, or an in-vehicle 104 computer (e.g., ECU—Engine Control Unit/OBD—On-board Diagnostics) and the like. A longitudinal axis 116 is shown with a dashed line with respect to front-back seat positions. A lateral axis 114 is shown with a dashed line in left-right direction. An intersection 118 of the lateral axis 114 and the longitudinal axis 116 is defined as a center of the vehicle 104 corresponding to mid-point between front and back wheels on the longitudinal axis 116 and mid-point along with the width of the car 104 along the lateral axis 114.

The smartphone 110 may include one or more sensors (hereinafter alternatively referred to as sensors/other sensors/one or more other sensors) such as an accelerometer (e.g., see accelerometer 1402 in FIG. 14), a gyroscope, a magnetometer, a location sensor such as a GPS (Global Positioning System) receiver (e.g., see GPS receiver 1404 in FIG. 14), a microphone, a camera, a light sensor, a temperature sensor, an altitude sensor, a proximity sensor, a compass and the like. Alternatively, the one or more sensors (such as sensors 1406 of FIG. 14) may separately be mounted at various places in the vehicle 104. The smartphone 110 may capture data/information using the one or more sensors. The captured data may include a plurality of location coordinates captured on a periodic basis, a plurality of acceleration values, orientation of the smartphone 110 and the like. For example, the GPS receiver of the smartphone may receive the plurality of location coordinates and accuracy factors of the plurality of location coordinates from a Global Navigation Satellite System (GNSS) 126. The GNSS 126 may include, but not limited to, the Global Positioning System (GPS) and/or the Global Navigation Satellite System (GLONASS). The GNSS 126 may also include satellite systems made available in the future, such as the Indian Regional Navigation Satellite. System (IRNSS), the so-called Galileo Satellite System, and the Beidou Navigation System. The captured data may either locally be analyzed or sent to a remote server 124 (hereinafter referred to as server 124) via a network 122. Examples of the network 122 may include wired networks, wireless networks or a combination thereof. Some examples of the wired networks may include Ethernet, local area network (LAN), fiber-optic cable network and the like. Some examples of the wireless networks may include cellular networks like GSM/3G/4G/CDMA networks, wireless LAN, Bluetooth or Zigbee networks and the like. An example of the combination of wired and wireless networks may include the Internet.

The server 124 may process the captured data either completely or partially (other part being already processed locally) to analyze the driver behavior, for example, for computing the insurance premium values or for transmitting the information to authorized relatives of the driver 102, if the driver 102 is new at driving. The driver behavior information may include such as maximum speed of the vehicle 104, frequency of accelerations/breaking events, talking on the smartphone 110 while driving, and the like. In an embodiment, the server 124 may compute deriver identification based on the driver behavior data as well as one or more other deterministic characteristics received from the smartphone 110. In an example embodiment, the server 124 may compute driver performance calculations and the computations may be sent to various entities such as insurance companies. Further, the data to identify the driver 102 and the driver performance may be provided as an online service, or as an application. Typical users of such an application or service include entities having a fleet of drivers or vehicles.

Additionally, various sensors/systems in-built in the vehicle 104 such as OBD, ECU, an airbag system, a seat-weight sensor system, a seat-belt sensor system, and/or an anti-lock braking system (ABS) may also be in communication with the smartphone 110 to provide data and/or information from the vehicle 104 that can be used to determine driver behaviour, deterministic characteristics and in turn, driver identification. Various embodiments and methods for localizing the smartphone 110 in the moving vehicle 104 are explained in detail hereinafter with reference to FIGS. 2-16.

In various embodiments, the functionalities of the server 124 may be performed in an on-board device having one or more processors, or even some or all functionalities can be performed in the smartphone. For instance, there can be a standalone system (not shown) equipped with such processing capability installed in the vehicle 104. Such system can constantly or intermittently receive data such as various acceleration values disclosed herein, GPS location information, location data, map data, etc. from the smartphone 110 and external devices as applicable. The standalone system can perform all the processing described with reference to FIGS. 2 to 16, for localizing the smartphone 110 within the moving vehicle 104. In an embodiment, the standalone system can store information related to the localization of the smartphone 110 during the entire trip of the vehicle 104. In an embodiment, the standalone system can be entirely integrated into the smartphone 110. In another embodiment, the standalone system can be a part of the OBD of the vehicle 104. Further, the data processed in the vehicle 104 (e.g., by the server 124 or the standalone device) may be transmitted to third parties like insurance companies or may be stored in a memory location present in the vehicle that can later be accessed and used by the insurance companies.

Figure 2:
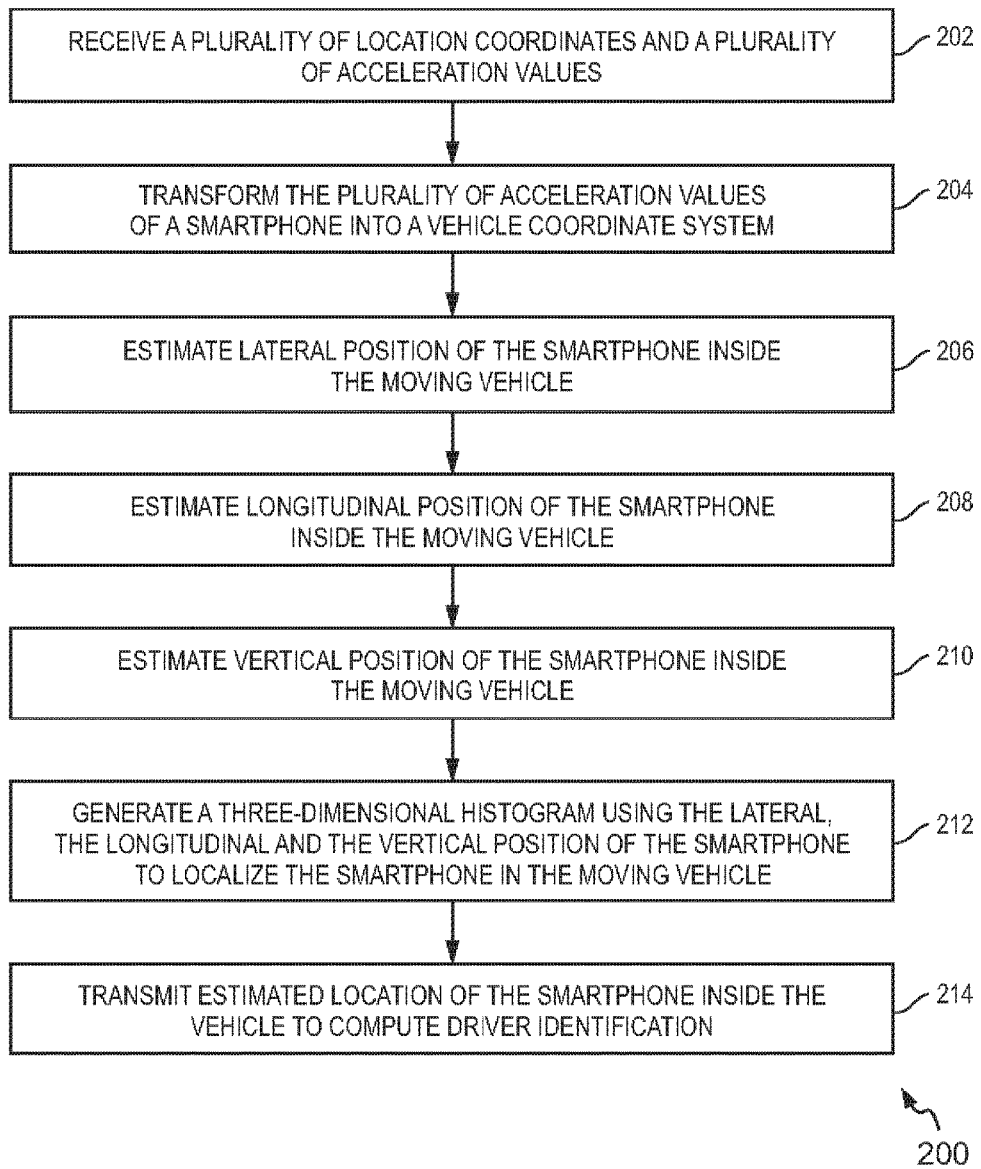
FIG. 2 illustrates a flow chart showing an example method for localizing a smartphone in accordance with an example embodiment of the present disclosure.

FIG. 2 illustrates a flow chart showing an overview method 200 for localizing a smartphone in accordance with an example embodiment of the present disclosure. The various steps and/or operations of the flow diagram, and combinations of steps/operations in the flow diagram, may be implemented by, for example, hardware, firmware, a processor, circuitry and/or by an apparatus (such as apparatus 1400 of the FIG. 14)/the smartphone 110/the server 124 of FIG. 1 of the present technology and/or by a different device associated with the execution of software that includes one or more computer program instructions. The method starts at step 202. It should be noted that the operations 202 to 214 are performed simultaneously or in sequential order, or even with small delays between successive operations.

At 202, a plurality of location coordinates (hereinafter referred to as location coordinates) and a plurality of acceleration values (hereinafter referred to as acceleration values) are received. The one or more sensors of the smartphone 110 may be able to detect such values. Examples include, but are not limited to, accelerations that originate from an acceleration event (e.g., the speeding up or slowing down of the car 104) that is perceived by the accelerometer, a progressive change in geographic location that originates from a location changing event (e.g., the movement from one place to another of the car 104) that is perceived by the GPS receiver, and the like.

At 204, the plurality of acceleration values of a smartphone is transformed into a vehicle coordinate system. In many embodiments, it is necessary to align orientation of the smartphone 110 with respect to the motion of the vehicle 104 in order to localize its position in the vehicle 104. The transformation of coordinate system of the smartphone 110 relative to coordinate system of the vehicle 104 is explained later in detail with reference to FIG. 3.

At 206, lateral position of the smartphone inside the moving vehicle is estimated. The location coordinates may be used along with lane marking information obtained from one or more aerial view images (hereinafter alternatively referred to as one or more aerial view images/aerial view image) captured around a region of the moving vehicle 104 to determine the position of the moving vehicle 104 on a lane and in turn determine the lateral position of the smartphone 110 inside the vehicle 104. In an embodiment, the location coordinates, the lane marking information and accuracy factors of the location coordinates are used to determine the lateral position. Additionally or alternatively, combination of the location coordinates, lane marking information, accuracy factor and the acceleration values of the vehicle 104 may be utilized to determine the lateral position of the smartphone 110 in the vehicle 104. One or more lateral positions estimated using both approaches may be compared and an optimum value may be selected for further analysis based on the comparison. A histogram of a plurality of the lateral position samples of the smartphone 110 may be generated to estimate the exact position. This is explained in detail later with reference to FIGS. 4 to 9.

At 208, longitudinal position of the smartphone inside the moving vehicle is estimated. For estimating longitudinal position within the vehicle 104, the acceleration in the direction of gravity may be considered. At least one repetition pattern corresponding to a vertical acceleration pattern in accelerometer signal/acceleration values is observed when at least one front wheel (such as the front wheel 1206 of FIG. 12) (hereinafter referred to as front wheel) and at least one rear wheel (such as rear wheel 1208 of FIG. 12) (hereinafter referred to as rear wheel/back wheel) of the vehicle 104 passes over one or more road discontinuities (hereinafter alternatively referred to as road discontinuity). Correlation between the vertical acceleration patterns is found and compared with a predefined threshold correlation value to determine the longitudinal position of the smartphone 110. A corresponding histogram of the plurality of longitudinal position samples of the smartphone 110 calculated for one or more road discontinuities may be generated. This is explained in detail with respect to FIGS. 9-13 later.

At 210, vertical position of the smartphone inside the moving vehicle is estimated. In at least one embodiment, the vertical position of the smartphone 110 may be determined using a first instantaneous height, a second instantaneous height, a first vertical acceleration and a second vertical acceleration values (described with reference to FIG. 12) computed with respect to the at least one front wheel and the at least one rear wheel of the moving vehicle 104, when the vehicle 104 is passing over the road discontinuity. A corresponding histogram of a plurality of vertical position samples may be generated. Alternatively, the altitude sensor of the smartphone 110 may be utilized to determine the vertical position of the smartphone 110.

At 212, a three-dimensional histogram using the lateral, the longitudinal and the vertical position of the smartphone to localize the smartphone in the moving vehicle is generated. In an embodiment, a 4D plot of the probability densities maybe constructed using the marginal probabilities and the most likely position of the phone may be inferred from the 3-dimensional histogram using the likelihood of the smartphone 110 along all three axes inside the vehicle 104. Alternatively, individual estimates of the lateral, longitudinal, and vertical positions of the smartphone 110 may be aggregated and the most likely estimated of the position of the smartphone 110 within the vehicle 104 is obtained.

At 214, estimated location of the smartphone inside the vehicle is transmitted to compute driver identification. For example, if the estimated position of the smartphone 110 is on the back-center seat of the car 104 of FIG. 1, and further if it is detected that there is an on-going call present in the smartphone 110, it may be determined that one of the passengers sitting the back-center seat is using the smartphone 110 and not the driver. As an another example, if the smartphone 110 is located in the cup holder 108 near front-left seat 106, and it is ringing to notify of a call from someone, the driver 102 may look down to identify the caller and ignore presence of a pedestrian at the moment and may suddenly apply the break to avoid accident with the pedestrian in the very next moment. The combination of the logics such as location of the phone, the change in the accelerations sensed for the break application, and the ringing of the phone 110 may collectively assist to determine if the driver 102 is distracted. This information, in turn, may help the insurance companies to determine the premium amount of the insurance to be given to the driver 102. The method ends at step 214.

Figure 3:
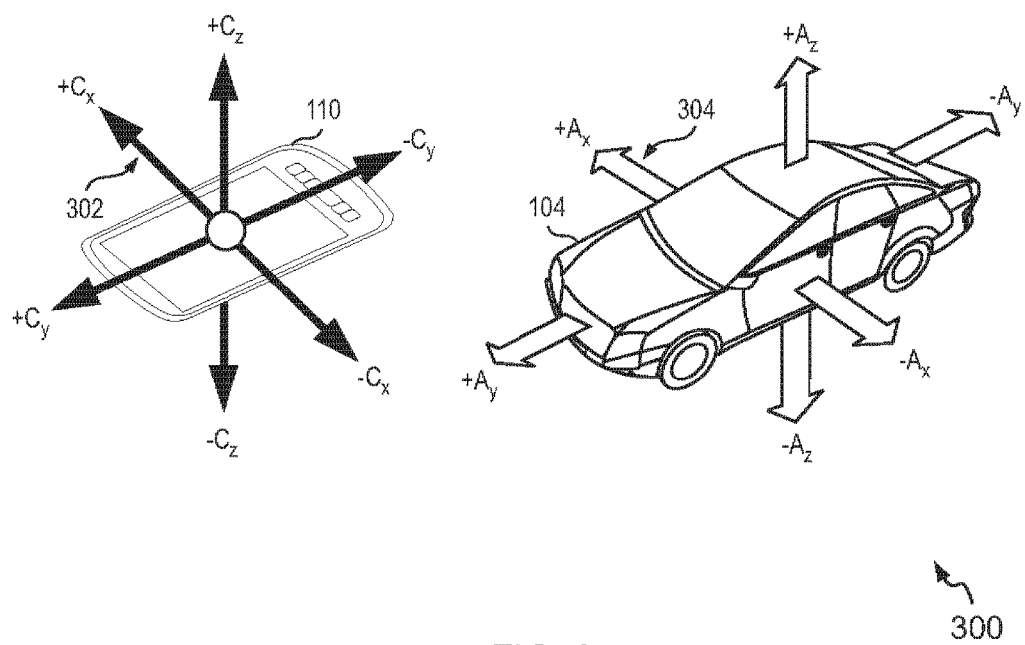
FIG. 3 illustrates a representation of coordinate system of a smartphone and a coordinate system of a vehicle in accordance with an example embodiment of the present disclosure.

FIG. 3 illustrates a representation 300 of coordinate system of a smartphone and a coordinate system of a vehicle in accordance with an example embodiment of the present disclosure. The coordinate system 302 of the smartphone 110 is depicted to include coordinates $C_x$, $C_y$ and $C_z$ and the coordinate system 304 of the vehicle 104 (hereinafter alternatively referred to as vehicle coordinate system) is depicted to include coordinates $A_z$, $A_y$ and $A_x$ as orthogonal to vehicle's floor pointing downwards, vehicle's direction of motion, and an axis orthogonal to the plane formed by the first two vectors.

In an embodiment, accelerations obtained in the phone's local coordinate system (Cx, Cy, and Cz) is transformed into the vehicle's coordinate system In an embodiment, the transformation is performed into two parts, 1. Transformation of local coordinates into intermediate coordinates and 2. Intermediate to vehicle coordinates.

In an example, temporal averages of each of the axes of the 3-axes accelerometer is calculated when the vehicle 104 is moving at a constant speed/stationary on a straight line on flat terrain/surface/region. Flatness of the surface and linear trajectory of the vehicle 104 may be ascertained by observing the GPS altitudes and bearings. Gravitational force may be the only external force acting on the phone 110 considering the vehicle's motion on the flat surface, the unit vector pointing towards gravity may be resolved in terms of local coordinate system (phone's coordinate system 302). If the smartphone 110 is rolled or pitched, the value read by the accelerometer for z-axis goes down, x-axis (for roll) and y-axis (for pitch) go up. Therefore, the exact orientation of the smartphone 110 with respect to the ground may be obtained. The pitch (Pc) and roll (Rc) is obtained using the following equation after setting azimuth (for example, horizontal elevation of the phone 110) to arbitrary value (e.g. 0) and by applying arctangent function to the coordinates of the phone 110.

$$P_c = a\tan(-C_y/\text{sqrt}(C_x^2 + C_z^2))$$

$$R_c = a\tan(-C_x/C_z)$$

Using $P_c$ and $R_c$, the acceleration may be transformed into an intermediate coordinate system ($B_x$, $B_y$, $B_z$) (not shown) where x-y plane is orthogonal to the gravity axis (z-axis).

$$[B_x, B_y, B_z]' = \text{rotMat} * [C_x, C_y, C_z]'$$

$$\text{rotMat} = \begin{matrix} Cr.*Ca + Sr.*Sp.*Sa & Cp.*Sa & -Sr.*Ca + Cr.*Sp.*Sa \\ -Cr.*Sa + Sr.*Sp.*Ca & Cp.*Ca & Sr.*Sa + Cr.*Sp.*Ca \\ Sr.*Cp & -Sp & Cr.*Cp \end{matrix}$$

where C and S stand for sine and cosine of azimuth (a) pitch ($P_c$) and roll ($R_c$).

The x-axis and y-axis of the intermediate coordinate system are two orthogonal vectors which lie in a plane that is orthogonal to gravity. The rotation matrix, rotMat, may be updated continuously each time, the vehicle 104 is moving on a straight line on the flat terrain.

The azimuth angle may be calculated to find the phone's orientation towards, away from or at an angle with respect to the motion of the vehicle 104. When one or more events such as acceleration or a braking of the vehicle 104 on the flat terrain occurs, the orientation of the phone changes significantly. For example, when the vehicle 104 slows down near a yield sign, or stops when approaching a traffic light, the acceleration/braking event may be defined as an instance when the absolute value of the change in speed of the vehicle 104 exceeds a pre-defined threshold in a per-defined time interval. Additional constraints such as monotonically varying speeds within the time interval may also be checked. To determine if the vehicle 104 is moving along a straight line over this duration, vehicle's bearing obtained from location coordinates is examined. The values of acceleration in x and y axis is only due to vehicle's acceleration/braking. The orientation of bearing with respect to the x-y axes is given as follows:

$$az = a\tan(B_y/B_x)$$

where az is the angle between the x-axis and vehicle's direction of motion. $B_y$ and $B_x$ are projected onto the direction of bearing (or the direction in which vehicle 104 is moving) and an axis orthogonal to bearing. az maybe updated each time there is an acceleration/breaking event. Values of $P_c$, $R_c$ and az, respectively, may be used to get rotMat and convert accelerations from phone 110 (local) to vehicle's coordinates as a single matrix vector product. This can be computed as shown below:

$$A_x = Bx \sin(az) - B_y \cos(az)$$

$$A_y = Bx \cos(az) + By \sin(az)$$

$$A_z = Bz$$

As shown, $A_y$ is the direction of bearing (or the direction of motion of the vehicle 104) and $A_x$ is the axis orthogonal to bearing. In various embodiments, transformation of the phone's coordinate system (302) into the vehicle coordinate system 304 may be accomplished in a number of different ways. For example, inputs from the accelerometer, the magnetometer and the GPS receiver may be averaged to transform the coordinates. Further, inputs originating at accelerometer, gyroscope and/or other sensors may be processed to identify real-time changes in the orientation of the smartphone 110. Alternatively, acceleration/magnetic/GPS values may be generated using one or more sensor fusion algorithms.

Figure 4:
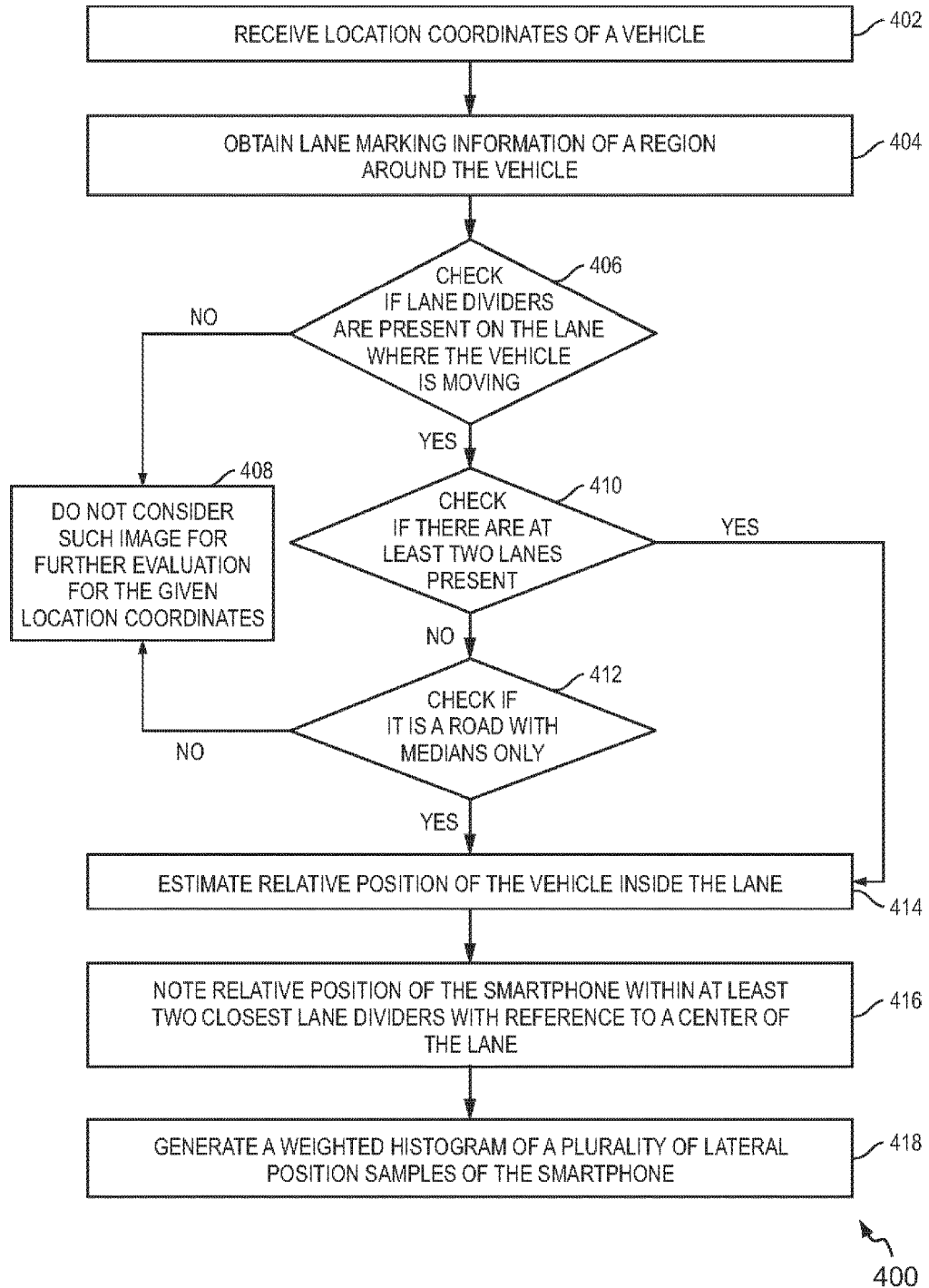
FIG. 4 illustrates a method for determining lateral position of a smartphone in accordance with an example embodiment of the present disclosure.

FIG. 4 illustrates a method 400 for determining lateral position of a smartphone in accordance with an example embodiment of the present disclosure. The lateral position of the smartphone 110 may be estimated using the data received from the one or more sensors of the smartphone 110 such as the plurality of location coordinates, lane marking information received using aerial view images and accuracy factors of the plurality of location coordinates received from GNSS 126.

At 402, location coordinates of a vehicle are received. In order to estimate the lateral position, the location coordinates of the vehicle 104 along the drive obtained using the GPS receiver are used along with horizontal and vertical accuracies that show region of uncertainty around the given location coordinates i.e. accuracy factors of the location coordinates in terms of a radius of meters.

At 404, lane marking information of a region around the vehicle is obtained. Using the instantaneous GPS coordinates of the vehicle 104 during the drive, aerial view (satellite/terrain) of the region around the location from a database such as Google Maps®, HERE Maps®, Waze maps and the like is obtained. The aerial view image may include one or more lane markers, the one or more road discontinuities, one or more lane dividers, one or more curved lanes, one or more medians, a lane center, one or more road borders, or one or more markers to separate multiple lanes of the region around the moving vehicle. The number of lanes/markers observed in the aerial view image may be dependent on various factors such as the zoom level of the aerial image, width of the road, and type of road (interstate/state) and the like.

At 406, it is checked whether lane dividers are present on the lane where the vehicle is moving. If not, such image is not considered for further evaluation for the given location coordinates at 408. Further, based on the lane dividers, the road may be categorized as one having one lane or less, or multiple lanes.

At 410, it is checked whether there are at least two lanes present (if the lane dividers are present on the lane where the vehicle is moving). If not, it is checked if it is a road includes only medians at 412. For example, a road with at least two lanes may be detected by observing the lane separators, road end markers and median markers. If not, such image is not considered for further evaluation for the given location coordinates at 408.

At 414, relative position of the vehicle 104 inside the lane is estimated (if there are at least two lanes present). If the road is classified as one with at least two lanes, a point on each of these lane dividers that is closest to the given location coordinate is marked. A road with a lane for to and fro traffic may also be considered in this group. Closeness is measured in terms of Euclidean distance between the given location coordinates and all the points on given lane dividers. At least two closest points on two separate lane dividers are selected. Further, At 414, if the road with medians only is present at 412, relative position of the vehicle 104 inside the lane is estimated. When the road with only median is separating to and fro traffic, the reference position is fixed to imaginary lane-center at a distance of half lane width from the median. The relative distance of the smartphone 110 is measured with respect to the imaginary center of the lane by subtracting the measured distance from the median.

At 416, relative position of the smartphone within at least two closest lane dividers is noted with reference to a center of the lane. It is assumed that the center of the lane coincides with the center 118 of the vehicle 104 which is intersection 118 of the longitudinal axis 116 and the lateral axis 114 as marked with dashed lines in the FIG. 1. A plurality of lateral position samples of the smartphone may be collected at a plurality of time instances.

At 418, a weighted histogram of a plurality of lateral position samples of the smartphone is generated. The observations of relative distances of the location coordinates (both multiple lanes and single lane) may be accumulated over the drive to generate the weighted histogram. An optimum value may be selected as the lateral position of the smartphone from the histogram i.e. the relative distance of the mode of the histogram is determined as the lateral position of the smartphone 110 during the drive. The method ends at step 418.

Figure 5A:
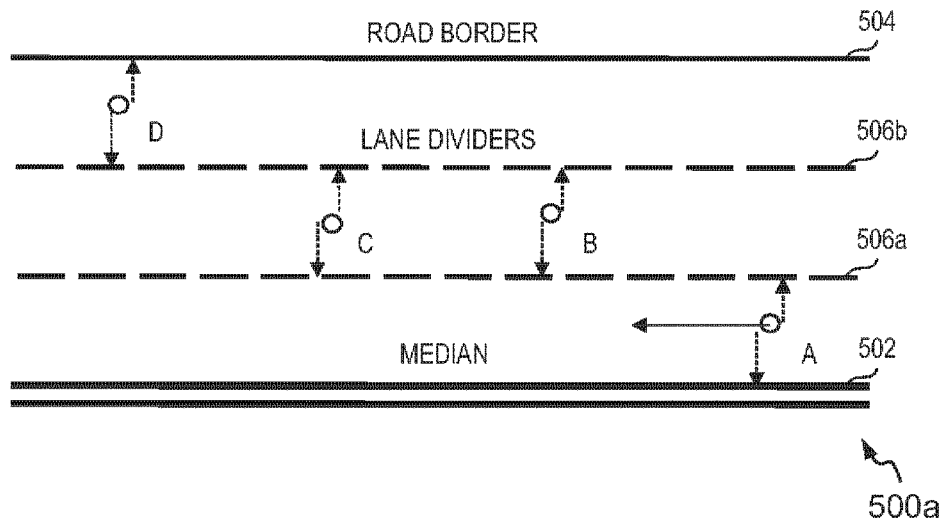
FIGS. 5A and 5b collectively illustrate example representations of a region around a moving vehicle using lane marking information to determine lateral position of a smartphone in accordance with an example embodiment of the present disclosure.
Figure 5B:
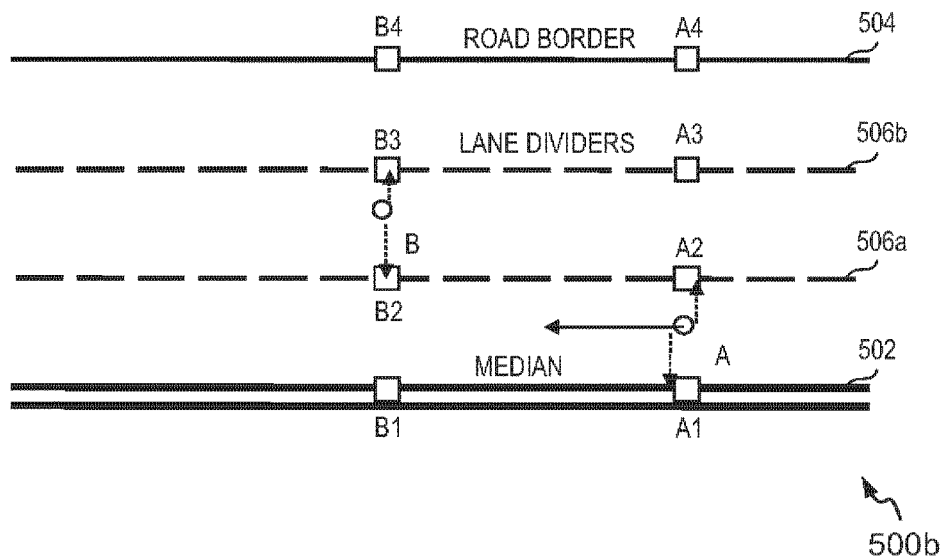

FIGS. 5A and 5B collectively illustrate example representations 500a and 500b of a region around a moving vehicle using lane marking information to determine lateral position of a smartphone in accordance with an example embodiment of the present disclosure. In an example embodiment, the lane marking information of the region around the moving vehicle 104 may be obtained using one or more aerial view images. The aerial view image of the region around the vehicle 104 may be obtained using digital maps such as Google Maps and similar navigational applications or using one or more vision sensors. Various locations A, B, C and D of the vehicle 104 as captured by the smartphone's GPS receiver at regular intervals are represented in FIG. 5A. Further, the aerial view of the region shows two lane dividers 506a and 506b, a median 502 between vehicles traveling in opposite directions, and a road border 504 on the right most side. As shown in FIG. 5B, a point is marked on each of the lane dividers 506a-b, the median 502 and the road border 504 that is closest to the given location coordinates of the vehicle 104. The closest points to the location A of the vehicle 104 is denoted as A1, A2, A3 and A4, respectively on the median 502, the lane dividers 506a, the lane divider 506b and the road border 504. Similarly, for the location B, closest points are denoted as B1, B2, B3 and B4. Of all such points, the two closest points on two separate lane dividers 506a-b may be selected for further analysis. As shown, the closest points for the location A are A1 and A2 and for the location B are B2 and B3. In at least one embodiment, at least two points are marked closest to the moving vehicle 104 on corresponding lanes using the lane marking information and the plurality of location coordinates. In an example embodiment, one or more image processing techniques may be applied to extract lane marking information from the aerial view image. Given the zoom level and the corresponding image, the Euclidean distance between any two pixels in the image may be computed directly.

Figure 6A:
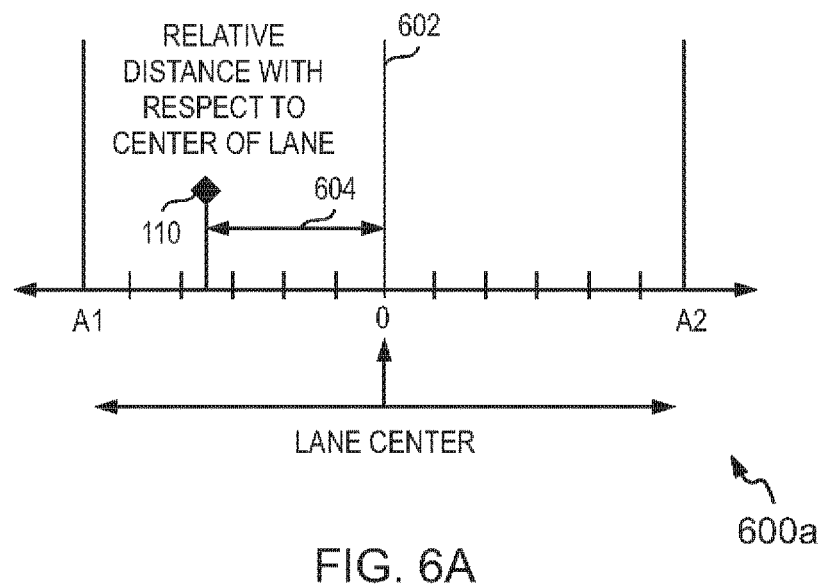
FIG. 6A and FIG. 6B illustrate representations of relative lateral positions of a smartphone on different types of lanes in accordance with an example embodiment of the present disclosure.
Figure 6B:
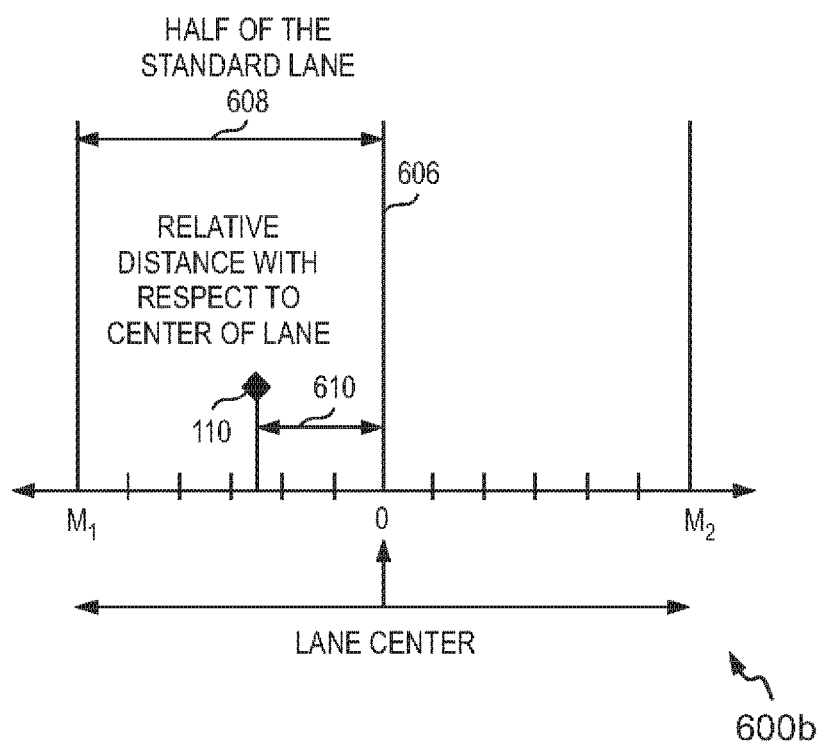

FIG. 6A and FIG. 6B illustrate representations 600a and 600b of relative lateral positions of a smartphone on different types of lanes in accordance with an example embodiment of the present disclosure. As shown in the FIG. 6A, the position of the smartphone 110 within the two closest marked points A1 and A2 for the location A of the vehicle 104 of FIGS. 5A-B is noted with reference to a center 602 of the lane marked with 0 (zero). The center 602 of the lane is considered coincided with the center of the vehicle 104 with respect to the intersection 118 of the longitudinal axis 116 and the lateral axis 114 of the vehicle 104 as show in FIG. 1. In an embodiment, the center 602 of the lane is a midpoint between the two closest marked points A1 and A2 respectively on the median 502 and the lane divider 506a as shown in FIG. 5B. The relative position of the smartphone 110 for the location A of the vehicle 104 is noted with respect to distance 604 from the lane center 602. For example, if the relative position computed for the smartphone 110 is negative, it is determined that the smartphone 110 is closer to the marked point A1 (towards the left—i.e. the median 502) compared to the marked point A2 (towards the right—i.e. the lane divider 506a) from which it is determined whether the smartphone 110 is on left side or right side inside the vehicle 104. In an embodiment, a plurality of lateral position samples of the smartphone 110 within the at least two marked points A1 and A2 with reference to the center 602 of the lane may be collected at a plurality of time instances.

FIG. 6B shows relative position of the smartphone 110 determined for a lane with only median without any lane dividers for separating to and fro traffic. As shown, the lane center 606 for medians only lane, is considered at a distance 608 of half lane width from the median. The lane width is taken as the standard lane width in that region based on factors such as country, state, county or municipality and is denoted as points M1 and M2. The relative distance 610 of the smartphone 110 is measured with respect to the predetermined/(imaginary) lane center 606 of the lane by subtracting the measured distance from the median. In an embodiment, multiple of such lateral position samples may be accumulated over the driver 102.

Figure 7:
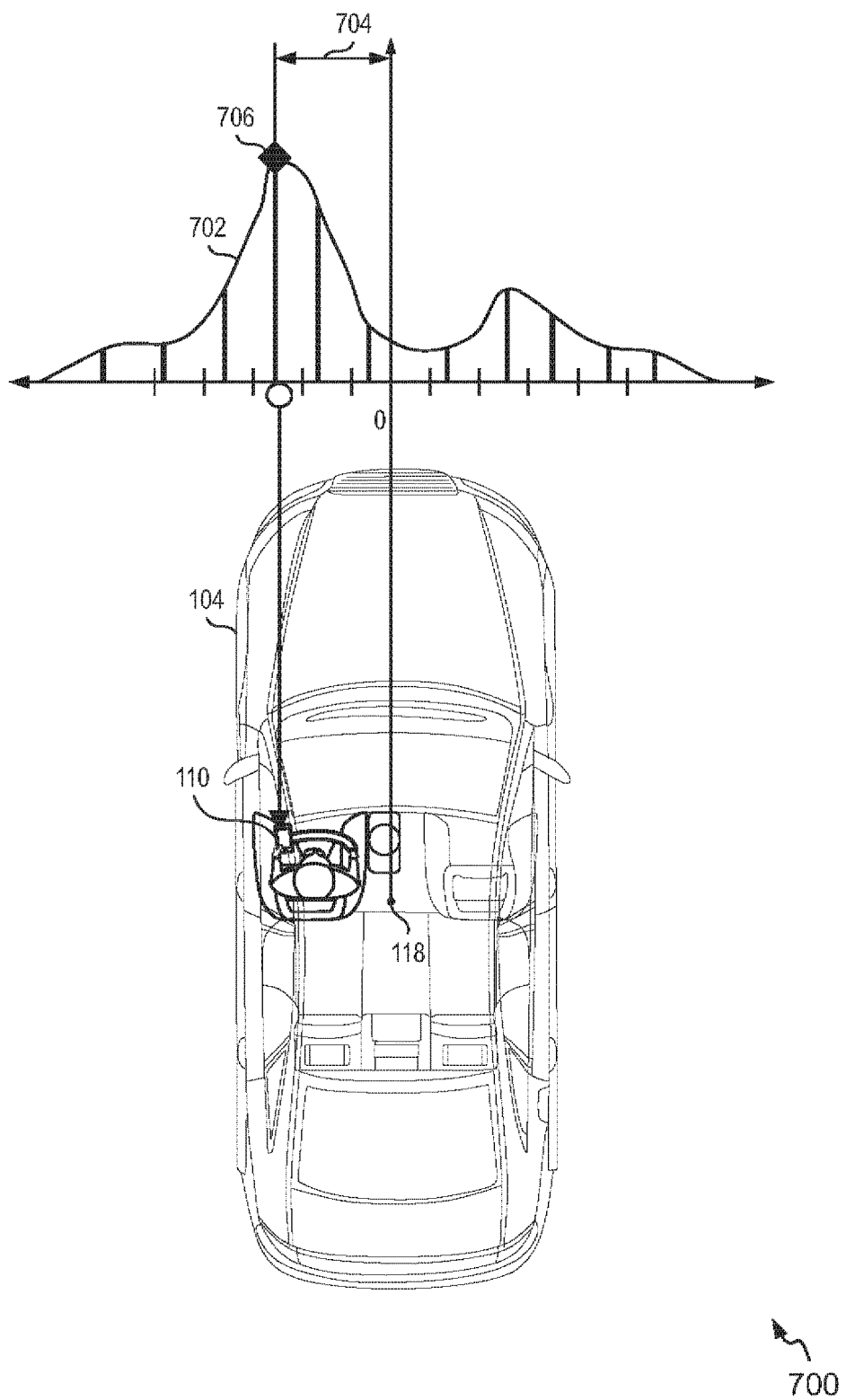
FIG. 7 illustrates a representation of a histogram generated based on a plurality of lateral position samples of a smartphone in accordance with an example embodiment of the present disclosure.

FIG. 7 illustrates a representation 700 of a histogram generated based on a plurality of lateral position samples of a smartphone in accordance with an example embodiment of the present disclosure. In an embodiment, the histogram 702 is a weighted histogram. In other embodiments, the histogram 702 may not be assigned any weights. Additionally, the weight assigned to each sample position of the smartphone 110 may be inversely proportional to the accuracy factors of the plurality of location coordinates of the moving vehicle 104 provided by the one or more sensors of the smartphone 110. In other embodiments, the weight function may also be a look up table, a non-linear function such as logarithm, or a step-wise linear function and the argument for such a function may be the accuracy of the GPS location. The value of the histogram 702 for a bin may be considered as the weighted summation of all the entries that fall within in the bin. Relative distance 704 of mode 706 of the histogram 702 with respect to the center 118 of the vehicle 104 (intersection 118) may be considered as the estimated lateral position of the smartphone 110 in the moving vehicle 104. The mode 706 of the histogram 702 may be selected as an optimum value to be the lateral position of the smartphone 110.

Figure 8:
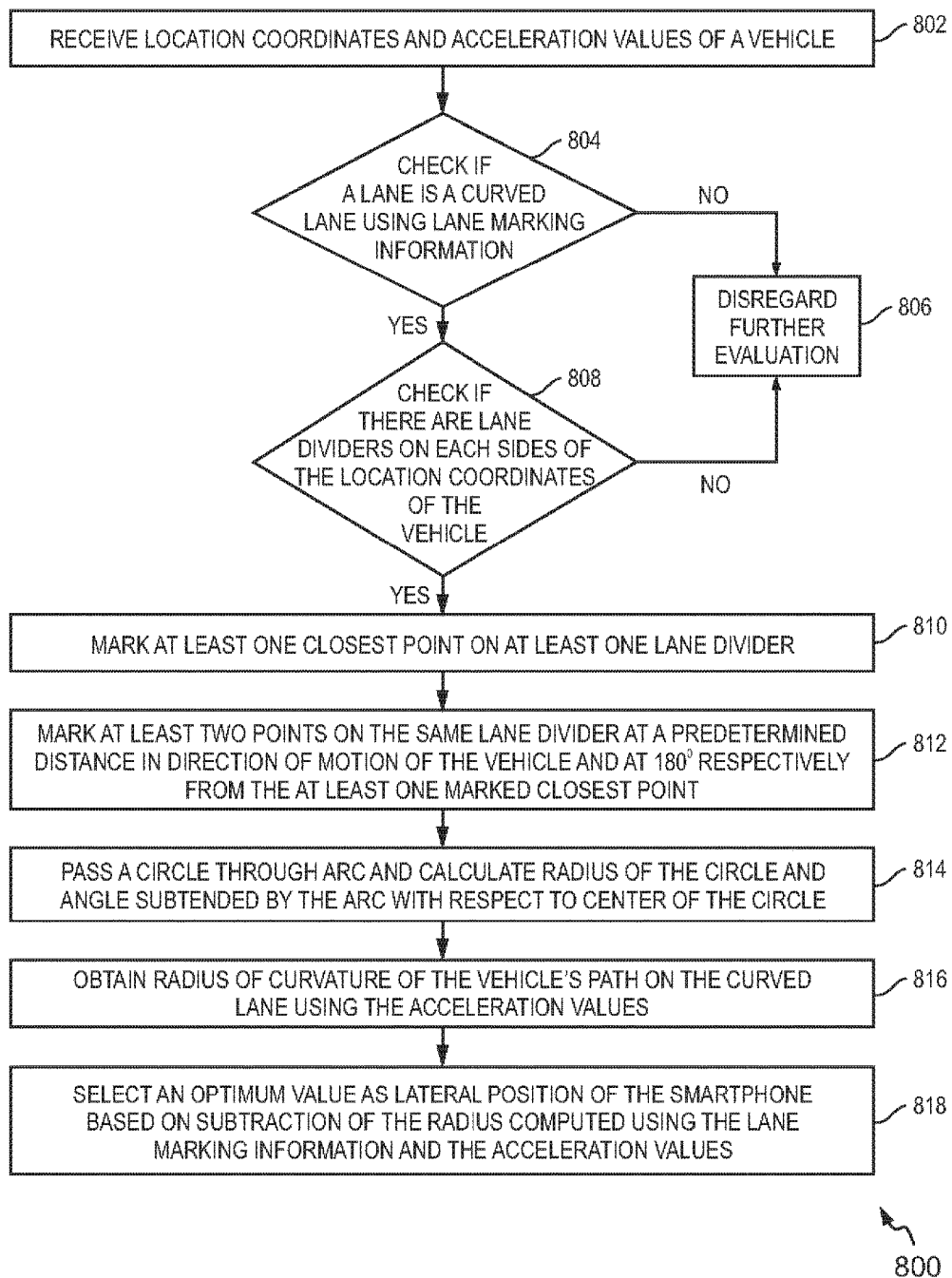
FIG. 8 illustrates a method for determining lateral position of a smartphone when a vehicle is moving on a curved lane in accordance with an example embodiment of the present disclosure.

FIG. 8 illustrates a method 800 for determining lateral position of a smartphone when a vehicle is moving on a curved lane in accordance with an example embodiment of the present disclosure. Centripetal accelerations due to turns and gravity components due to roll of the vehicle's movement show up in the (right-left) lateral direction. The method 800 may be implemented using the one or more sensors of the smartphone 110 and using the lane marking information of the region around the moving vehicle 104. The one or more steps of the method may be performed by the apparatus of the present disclosure or remotely by the server 124 or a combination thereof. The method starts at step 802.

At 802, location coordinates and acceleration values of vehicle are received.

At 804, it is checked if a lane is a curved lane using lane marking information. If not, further evaluation is disregarded at 806.

At 808, it is checked if there are lane dividers on each sides of the location coordinates of the vehicle (if the lane is a curved lane at 804). If not, further evaluation is disregarded at 806.

At 810, at least one closest point on at least one lane divider is marked (if the lane is curved lane and there are lane dividers on each side of the location coordinates of vehicle 104).

At 812, at least two points on the same lane divider are marked at a predetermined distance in direction of motion of the vehicle and at 180a respectively from the at least one marked closest point.

At 814, a circle is passed through arc and radius of the circle and angle subtended by the arc with respect to center of the circle is calculated. In an example embodiment, the calculated radius and the angle may be compared with a respective predefined threshold range and values.

At 816, radius of curvature of the vehicle's path on the curved lane may be obtained using the acceleration values. In an embodiment, a plurality of lateral position samples of the smartphone for a vehicular path on the curved lane may be computed by determining a plurality of relative positions of the moving vehicle with respect to radius of curvature of the vehicular path obtained as a function of speed and the plurality of acceleration values of the moving vehicle.

At 818, an optimum value as lateral position of the smartphone is selected based on subtraction of the radius computed using the lane marking information and the acceleration values. In an embodiment, multiple of such lateral position samples of the smartphone 110 inside the vehicle 104 moving on the curved lane may be accumulated over the driver. The method ends at step 818.

Figure 9:
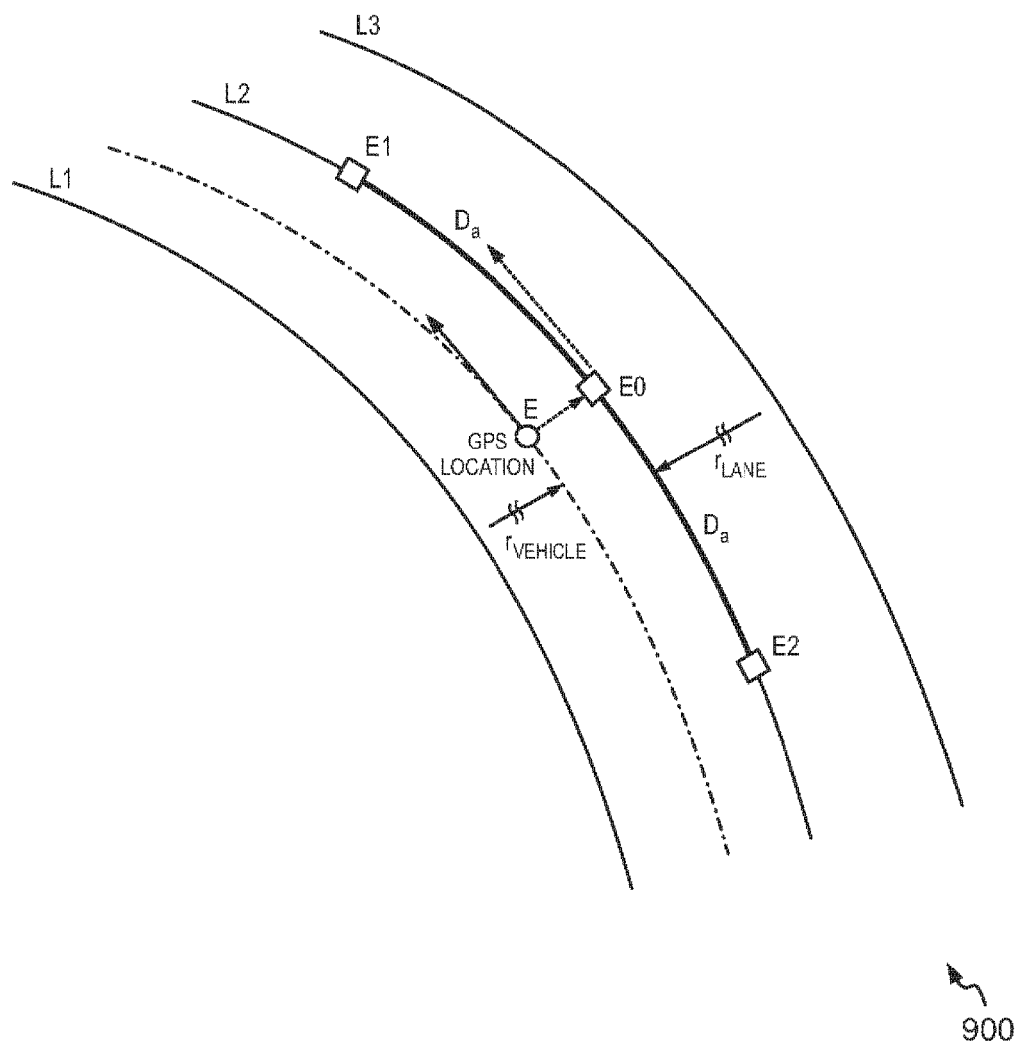
FIG. 9 illustrates a representation of relative position of a vehicle moving on a curved lane to determine lateral position of a smartphone in accordance with an example embodiment of the present disclosure.

FIG. 9 illustrates a representation 900 of relative position of a vehicle moving on a curved lane to determine lateral position of a smartphone in accordance with an example embodiment of the present disclosure. When the vehicle 104 turns, it experiences various physical forces that are different at different points of the vehicle 104 and such physical forces may be continuously measured at every such point on the vehicle 104 during such turn. In an embodiment, radius of a curved lane closest to the vehicle 104 may be obtained based on the lane marking information. As shown, the region around the vehicle's location E has three lane dividers L1, L2 and L3 as received from the lane marking information. At least one point closest to the vehicle's location E is marked as E0 on the lane divider L2. Two points E1 and E2 are located as shown, each at a predetermined distance $D_a$ from the point E0, by traversing along the lane divider L2 in two directions. The two directions may be such as in the direction of the motion of the vehicle 104 (towards point E1) and 180° offset from the direction of the vehicle 104 (towards point E2) such that arc E1-E0-E2 is of length $2*D_a$.

In an embodiment, $D_a$ may be Euclidean distance. In an example embodiment, it may be a pixel wise distance on the aerial view image. A circle is passed through the arc E1-E0-E2 and radius (denoted as $r_{LANE}$) of such a circle and an angle subtended by the E1-E0-E2 arc with respect to center of the circle are calculated. A threshold based criteria may be used to filter out arcs that have too small or too large radius ($TH_R > r_{LANE} > TH_r$) or too small angles (angle $> TH_c$).

In at least one embodiment, radius of curvature (denoted as $r_{VEHICLE}$) of the vehicle's path on the curved lane represented by the dotted line based on the vehicle's location E may be obtained as a ratio of square of the vehicle's speed (obtained using the one or more sensors of the smartphone 110) and the magnitude of acceleration (obtained using the accelerometer) at that instant ($r_{VEHICLE} = V^2/A$).

In an example embodiment, the difference between the radius computed using the lane marking information (arc E1-E0-E2), and using the accelerometer ($V^2/A$) may be used as a relative position of the smartphone within the lane. Multiple such lateral position samples may be computed over time and a corresponding histogram may be generated to estimate the lateral position of the smartphone 110 inside the moving vehicle 104. In various embodiments, the lateral position of the smartphone 110 may be computed using relation between the forward acceleration and angular velocity of the vehicle 104. Alternatively, instead of forward acceleration, upward acceleration may be used to determine the lateral position of the smartphone 110. In an embodiment, the lateral position of the smartphone 110 may assist in determining driver identification. For example, if the location of the smartphone 110 is sufficiently to the left side with respect to the center of the vehicle 104, it may be fairly assumed that the smartphone 110 is being used/in the possession of the driver 102.

In an example embodiment, if a telematics device or an OBD device is mounted inside the vehicle, the GPS coordinates of the vehicle 104 may be obtained from such device and compared with the location coordinates provided by the GPS receiver of the smartphone 110. A plurality of such location coordinate samples may be accumulated over the drive and difference between the location coordinates received through the OBD device and the location coordinates obtained from the smartphone 110 may be computed to get the position of the smartphone 110 relative to OBD device mounted inside the vehicle 104. In other example embodiments, the vehicle's location coordinates may only be received from the smartphone 110.

Figure 10:
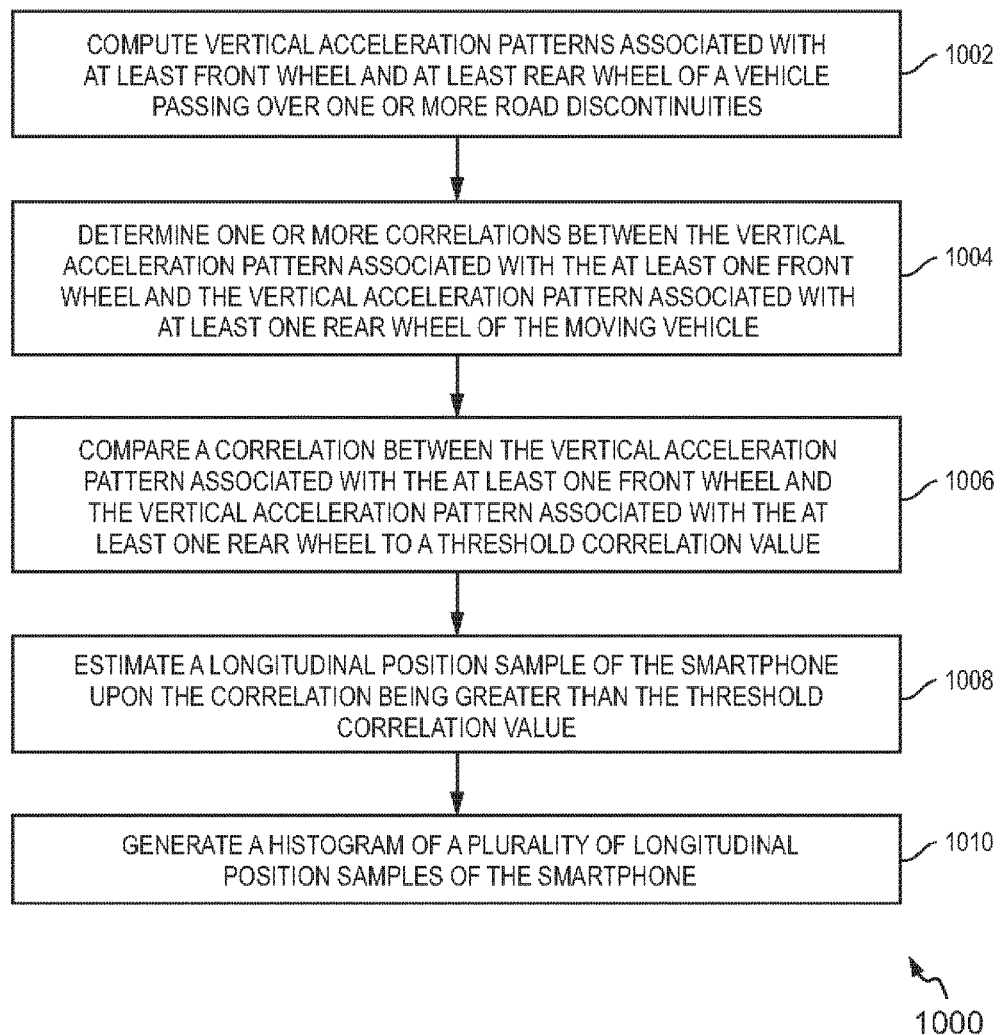
FIG. 10 illustrates a method for determining longitudinal position of a smartphone in accordance with an example embodiment of the present disclosure.

FIG. 10 illustrates a method 1000 for determining longitudinal position of a smartphone in accordance with an example embodiment of the present disclosure. The various steps and/or operations of the flow diagram, and combinations of steps/operations in the flow diagram, may be implemented by, for example, using the one or more sensors of the smartphone 110 or by a combination of the smartphone 110 and the server 124. The method starts at 1002.

At 1002, vertical acceleration patterns associated with at least front wheel and at least rear wheel of a vehicle passing over one or more road discontinuities are computed. In an embodiment, the vertical acceleration pattern may be computed from an accelerometer sensor present in the smartphone. The one or more road discontinuities may include, for example, a bridge along the road, a joint that connects columns of a flyover, one or more potholes, one or more speed breakers and the like. In an example embodiment, component of acceleration values along the direction of the gravity is analyzed and the self-similarity of the vertical acceleration patterns over a duration is measured. The duration may be a function of a distance between the at least one front wheel and the at least one rear wheel of the vehicle 104 and the speed of the moving vehicle 104.

At 1004, one or more correlations between the vertical acceleration pattern associated with the at least one front wheel and the vertical acceleration pattern associated with at least one rear wheel of the moving vehicle, are determined. It is understood that the patterns corresponding to the speed-breaker may not be similar to the patterns generated for the bridge-road discontinuity. Further, the patterns over two different speed-breakers may not be similar as the structure of the speed-breakers may be different in different regions such as different counties, different states, etc. The one or more correlations may be determined over a duration. For example, if the distance/separation between the front and back wheels of the vehicle 104 is 2 meters, and the speed of the vehicle 104 is 5 meters/second, then the duration over which the patterns are correlated may be of 2*0.2=0.4 seconds. The correlation duration may also be varied according to the speed of the vehicle 104.

At 1006, a correlation between the vertical acceleration pattern associated with the at least one front wheel and the vertical acceleration pattern associated with the at least one rear wheel is compared to a threshold correlation value. In an example embodiment, multiple patches of the vertical acceleration patterns may be correlated in the form of a bank of correlators and the correlator that gives maximum instantaneous correlation may be selected for further analysis.

At 1008, upon the correlation being greater than the threshold correlation value, a longitudinal position sample of the smartphone is estimated. In an example embodiment, multiple of such longitudinal position samples may be estimated based on a standard deviation of the vertical acceleration pattern associated with the at least one front wheel and a standard deviation of the vertical acceleration pattern associated with the at least one rear wheel of the moving vehicle 104. Further, a logarithm of a ratio of standard deviations of correlated patterns may be computed. If the standard deviation in the correlated patterns is similar, it may be determined that the smartphone 110 may be equidistant from the front and rear wheels of the vehicle 104. Further, if the standard deviation of the correlated patterns is more when the front wheels go over the road discontinuity as opposed to when the back wheels go over the same discontinuity, it is determined that the smartphone 110 is closer to the front wheels of the vehicle 104. It means if the computed value is positive (the ratio before taking logarithm is greater than 1), it indicates that the smartphone 110 may be closer to the front wheel and if negative, it is closer to the rear wheels of the vehicle 104. In an example embodiment, the same approach may be further expanded to determine if smartphone 110 is on the right side or the left side of a vehicle 104, such as by analyzing information pertaining to passing over lane-separating bumps twice during a lane change.

At 1010, a histogram of a plurality of longitudinal position samples of the smartphone is generated. The mode of the histogram gives the relative longitudinal position of the smartphone 110 within the vehicle 104 over the driver 102 for each of the one or more road discontinuities. The method ends at 1010.

Figure 11:
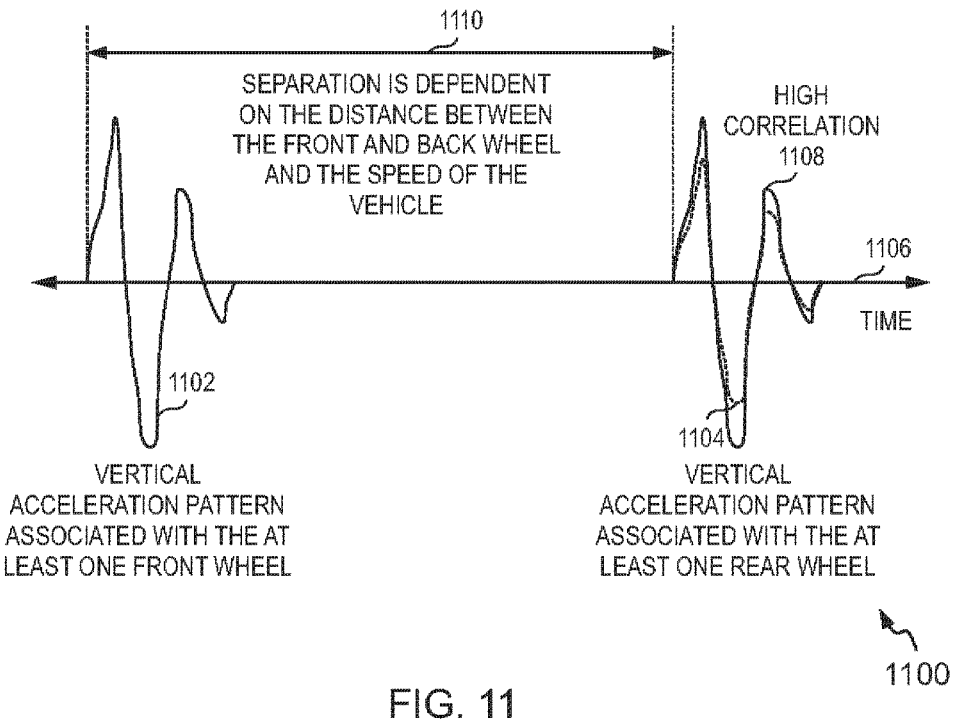
FIG. 11 illustrates a representation of correlation between vertical acceleration patterns associated with each of at least one front wheel and at least one rear wheel of a vehicle passing over a road discontinuity in accordance with an example embodiment of the present disclosure.

FIG. 11 illustrates a representation 1100 showing correlation between vertical acceleration patterns associated with each of at least one front wheel and at least one rear wheel of a vehicle passing over a road discontinuity in accordance with an example embodiment of the present disclosure. Timing (as shown by the line 1106) and magnitude of the acceleration values and/or changes thereto that are detected by the accelerometer sensor of the smartphone 110 may be used to form a corresponding vertical acceleration pattern 1102 for the at least one front wheel and a vertical acceleration pattern 1104 (dotted pattern) for the at least one rear wheel of the vehicle 104 passing over the road discontinuity. The vertical acceleration (repetition) pattern 1104 for the rear wheel passing over the road discontinuity depends upon the distance between the front wheels and the rear wheels of the vehicle 104 and the speed of the vehicle 104 at that instant as denoted by separation 1110. A correlated pattern 1108 (solid pattern) shows high correlation between the vertical acceleration pattern 1102 associated with the at least one front wheel and the vertical acceleration pattern 1104 associated with at least one rear wheel of the moving vehicle 104.

In an example embodiment, multiple of such correlations may be determined amongst multiple of patches of the vertical acceleration patterns associated with each of the front and rear wheels of the vehicle 104 for each of the one or more road discontinuities. The distance between the front and rear wheels of the vehicle 104 may be estimated using a delay where the correlation exceeds a threshold correlation value multiplied by the speed of the vehicle 104. An average value over multiple observations of such computed distances may be used to improve the robustness. Further, the correlation may be estimated by applying filter on the accelerometer signal in order to restrict the bandwidth of the signal. The correlation may be computed on a filtered accelerometer signal/vertical acceleration pattern, where the filtering may be a highpass filter, a lowpass filter or a bandpass filter. In an example embodiment, a histogram of logarithm of ratio of standard deviation may be created over the drive. The abscissa corresponding to the mode of histogram, may be mapped to a relative distance of the smartphone 110 with respect to mid-point between front and back wheels within the vehicle 104. In an example embodiment, multiple of such histograms may be generated.

Figure 12:
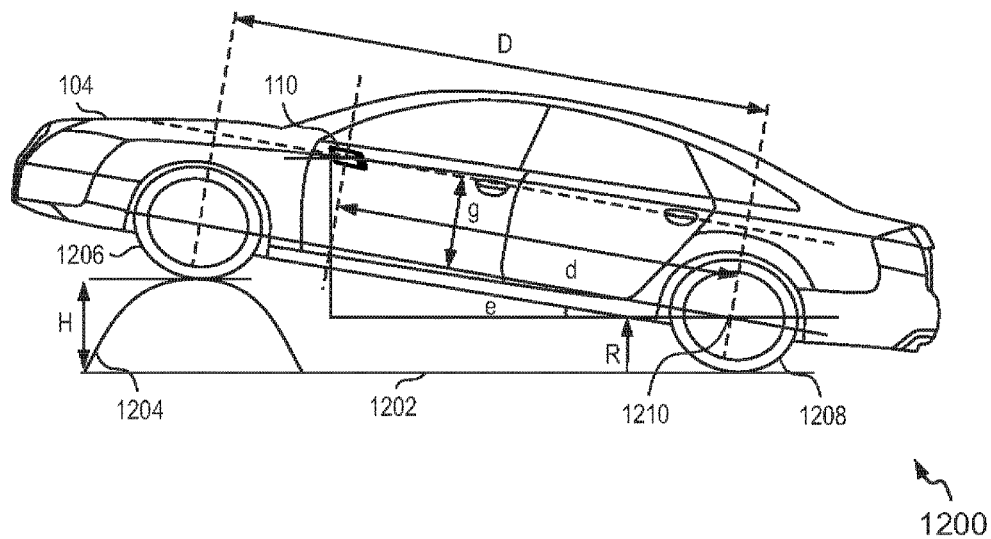
FIG. 12 illustrates a representation of a smartphone in a moving vehicle passing over a road discontinuity to determine longitudinal and vertical position of a smartphone in accordance with an example embodiment of the present disclosure.

FIG. 12 illustrates a representation 1200 of a smartphone in a moving vehicle passing over a road discontinuity to determine longitudinal and vertical position of a smattphone in, accordance with an example embodiment of the present disclosure. When the vehicle 104 passes over the road discontinuities such as a speed breaker or pothole it faces changes in forward and vertical acceleration/deceleration. For example, if the smartphone 110 is in the front of the vehicle 104, it experiences an increase in its vertical acceleration and positive pitch during positive forward acceleration such as stepping on the gas paddle. Similarly, if the smattphone 110 is in the rear of the vehicle 104, it experiences a decrease in its vertical acceleration and positive pitch. Further, if the smartphone 110 is in the front of the vehicle 104, it experiences a decrease in its vertical acceleration and negative pitch during negative forward acceleration such as braking whereas if the smartphone 110 is in the rear of the vehicle 104, it experiences an increase in its vertical acceleration and negative pitch.

The vehicle 104 shown is passing over a road discontinuity such as a bump 1204 at a height of H with respect a ground surface 1202. The at least one front wheel 1206 is shown resting, on the bump 1204 and the at least one rear wheel 1208 is shown resting on the ground surface 1202. Center of the rear wheel 1208 is denoted as point 1210. Further, the front wheel 1206 and the rear wheel 1208 are separated by a distance D meters and the smartphone 110 is kept at a distance of d from the center 1210 of the rear wheel 1208. In an embodiment, the distance D may be calculated by division of the duration over which the one or more correlations are determined (as explained with reference to FIG. 11) and the speed of the vehicle 104 at that instant. Alternatively, the distance D may be extracted from dimensions of vehicle model. The smartphone 110 is shown at a height of (g+R) from the ground surface 1202 when none of the wheels of the vehicle 104 are on the discontinuity 1204, g being the height relative to the center of the respective wheels 1206-1208 and R being radius of the respective wheels 1206-1208. The instantaneous height H of a point on the ground surface 1202 before the bump 1204 may be denoted as a function of time, hereinafter referred to as H(t). The instantaneous angle of elevation (as denoted by e in FIG. 12) of the vehicle 104 with respect to the rear wheel 1208, when the front wheel 1206 is on the bump 1204 and the rear wheel 1208 is on flat portion of the ground surface 1202 may be determined using the equation as follows:

$$\sin(e(t))=H(t)/D$$

Where the instantaneous angle of elevation e(t) is the pitch calculated as a function of Arctangent of the vehicle's coordinates ($A_x$, $A_y$, $A_z$) as shown below:

$$e=a\tan(-A_y/\mathrm{sqrt}(A^2_x+A^2_z))$$

A first instantaneous angle of elevation of the front wheel 1206 with respect to the ground surface 1202 when the front wheel 1206 passes over the bump 1204 is determined. Similarly, a second instantaneous angle of elevation of the rear wheel 1208 with respect to the ground surface 1202 when the rear wheel 1208 passes over the bump 1204 is determined.

The first instantaneous height of the smartphone 110 in the vertical direction with respect to the flat portion of the ground surface 1202, when the front wheel 1206 is over the discontinuity/bump 1204 is $$H_f(t)=d\sin(e(t))+R+g\cos(e(t))$$

Similarly, when the rear wheel 1208 goes over the discontinuity/bump 1204 and the front wheel 1206 is on the flat portion of the ground surface 1202, the second instantaneous height of the smartphone 110 in the vertical direction with respect to the flat portion of the ground surface 1202 is $$H_b(t)=(D-d)\sin(e(t))+R+g\cos(e(t))$$

The first vertical acceleration of the smartphone 110 after compensating for the gravity may be given as the second derivative of the vertical displacement. The vertical acceleration when front wheel 1206 is on the bump 1204 and the rear wheel 1208 is on the flat portion of the ground surface 1202 is $$A_f(t)=(d)d^2\sin(e(t))/dt^2+g\,d^2\cos(e(t))/dt^2$$

Similarly, the second vertical acceleration of the smartphone 110 when the rear wheel 1208 is on the bump 1204 and the front wheel 1206 is on the flat portion of the ground surface 1202 is $$A_b(t)=(D-d)d^2\sin(e(t))/dt^2+g\,d^2\cos(e(t))/dt^2$$

In an embodiment, the longitudinal position of the smartphone with respect to a reference point in the moving vehicle based on the first instantaneous angle of the elevation, the second instantaneous angle of the elevation, the first vertical acceleration $A_f(t)$, the second vertical acceleration $A_b(t)$ may be determined. In an example embodiment, derivative operation may be approximated by using finite difference operation on sampled observations of the instantaneous angle of the elevation e(t). The two unknowns, d and g present in the above two equations may be solved directly.

In order to improve noise robustness, a least squares fit may also be done using multiple observations of $A_f(t)$, $A_b(t)$, and e(t). Alternatively, the above two equations may be solved using other norm minimization techniques, and also using constrained minimization techniques. Examples of such constraints may be the limits on the values that g and d may take for a particular car etc. In an example embodiment, integration over the duration when the vehicle 104 is on the discontinuity 1204 may be applied on either equation $A_f(t)$ or $A_b(t)$ to solve the values of d and g. In yet another embodiment, multiple observations of $A_f(t)$ over multiple discontinuities may be taken and the values of d and g may be computed using the vertical accelerations of either front wheel 1206 or rear wheel 1208 alone. Using the value of d, relative longitudinal position of the smartphone 110 in the vehicle 104 may be determined as d−D/2. In an embodiment, multiple of such longitudinal pattern samples may be calculated over the drive for one or more road discontinuities.

Figure 13:
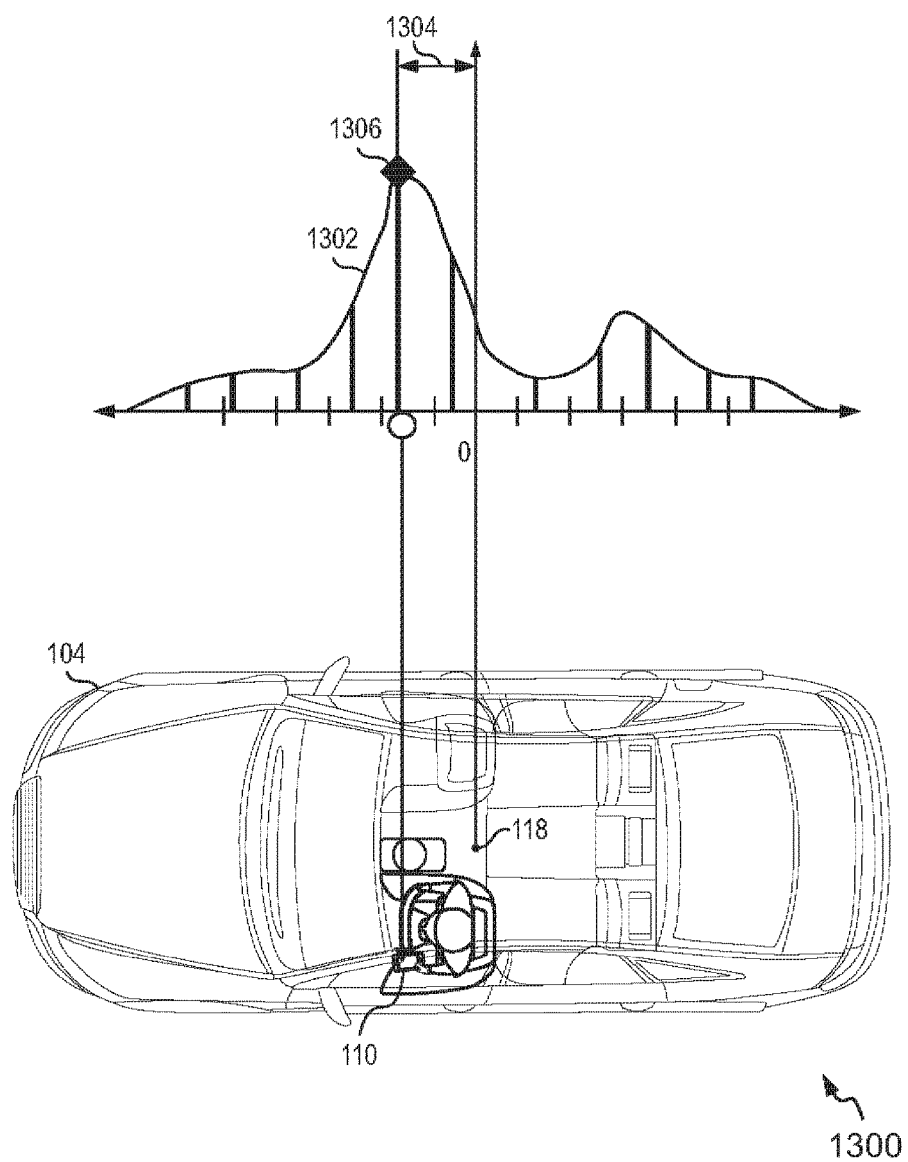
FIG. 13 illustrates a representation of a histogram generated based on a plurality of longitudinal position samples of a smartphone in accordance with an example embodiment of the present disclosure.

FIG. 13 illustrates representation 1300 of a histogram generated based on a plurality of longitudinal position samples of a smartphone in accordance with an example embodiment of the present disclosure. Relative distance 1304 of mode 1306 of the histogram 1302 with respect to the center 118 of the vehicle 104 (intersection 118) may be considered as the estimated longitudinal position of the smartphone 110 in the moving vehicle 104. The mode 1306 of the histogram 1302 may be selected as an optimum value to be the longitudinal position of the smartphone 110. In an example embodiment, multiple longitudinal position samples of the smartphone 110 estimated using both the approaches as explained with reference to FIG. 11 and FIG. 12 may be compared and only optimum position samples may be considered based on the comparison to generate the histogram 1302.

Referring again to FIG. 12, vertical position of the smartphone 110 in the vehicle 104, relative to the ground surface 1202, is determined using the value of g as g+R (R being the radius of the respective wheels 1206-1208 of the vehicle 104). The vertical position of the smartphone 110 may be determined using the first instantaneous angle of elevation, the second instantaneous angle of elevation, the first vertical acceleration $A_f(t)$ and the second vertical acceleration $A_b(t)$. A corresponding histogram may be created from the values of g+R obtained by solving the one or more linear equations for acceleration as explained hereinabove. The histogram may represent the distribution of the height of the smartphone 110 relative the ground surface 1202. The mode of the histogram may be used to infer the vertical position of the phone 110 inside the vehicle 104. Alternatively, the vertical position of the smartphone 110 in the vehicle 104 may be determined using the altitude sensor of the smartphone 110 relative to the instantaneous ground reference. This information may be used to infer whether the phone 110 is in the driver's shirt pocket or trouser pocket, or whether it is in the glove compartment or mounted like a dash camera. The difference between the instantaneous altitude of the vehicle 104 and the altitude of the ground surface 1202 (road) at a point may be calculated for a given GPS location of the smartphone 110 during the drive. In an example embodiment, a histogram of a plurality of vertical position samples of the smartphone 110 may be generated. The mode of the histogram may be taken as the height/vertical position of the smartphone 110 during the drive.

In an embodiment, using the positions of the smartphone 110 inside the vehicle 104 in terms of likelihood along all three axes, a 4D plot of the probability densities may be constructed using the marginal probabilities and the most likely position of the phone 110 may be inferred from 3-dimensional histogram. Further, it may be determined whether the driver 102 is using the smartphone 110 while driving based on the location of the smartphone 110 inside the vehicle 104. The server 124 (or the standalone system installed in the vehicle 104 or the smartphone 110) may transmit this information to various insurance companies or the fleet owners of drivers. For example, if the smartphone 110 is located near the steering wheel 112 of the vehicle 104, this information may be combined with other deterministic characteristics such as text writing/reading patterns, screen viewing patterns to identify that the phone 110 is being held in one of the hands of the driver 102 while he is driving. The text writing patterns of a driver 102 who is multi-tasking between typing and driving are different than those of a passenger who can fully focus on the typing. Further, drivers tend to change the orientation of the smartphone 110 more frequently when attempting to read a message of a given length in order to periodically glance back at the road.

In an embodiment, various movements and/or forces detected by the one or more of sensors of the smartphone 110 corresponding to the driver 102 may be combined with the location of the smartphone 110 to identify the driver 102. For example, when the smartphone 110 is in contact with the driver 102 who is turning the steering wheel 112, the accelerometer and/or the gyroscope of the smartphone 110 may detect certain accelerations and rotations as the driver 102 also causes the smartphone 110 to move by rotating the steering wheel 112. Further, when the driver 102 is taking a sharp turn, or breaking suddenly after seeing an object crossing the lane in front, there originates in advance/post such events a slightly different acceleration/deceleration and/or angular movement in the driver's body manoeuvre as detected by the one or more sensors of the smartphone 110 which may be considered to identify the driver 102. Other such events may include, for example, the driver 102 accelerating to avoid an accident due to an unforeseen object or circumstances, the driver 102 overtaking above the allowed speed limit, the driver 102 driving in a zigzag manner, the driver 102 cornering to avoid an accident due to an unforeseen object or circumstances, and the like.

Based on a retrospective analysis of such inputs corresponding to acceleration/deceleration of the vehicle 104 with inputs corresponding to driver's body manoeuvre detected immediately prior/after any such event, it can be determined whether person operating the smartphone 110 is a driver 102 or a passenger. Further, if the driver 102 is cornering, the sensors of the smartphone 110 may detect the same using various techniques. For example, the location coordinates using the GPS receiver may be used to determine the amount of turn to assist in measuring the cornering event. In an example embodiment, the approaches described hereinabove may be utilized to locate the smartphone 110 even when the driver 102 frequently changes the lanes or is zigzagging through traffic. A driver 102 is considered to change lanes too frequently if there are many lane changes in a short distance or short duration of time or if there are many lane changes being done in comparison to other vehicles on the road.

Figure 14:
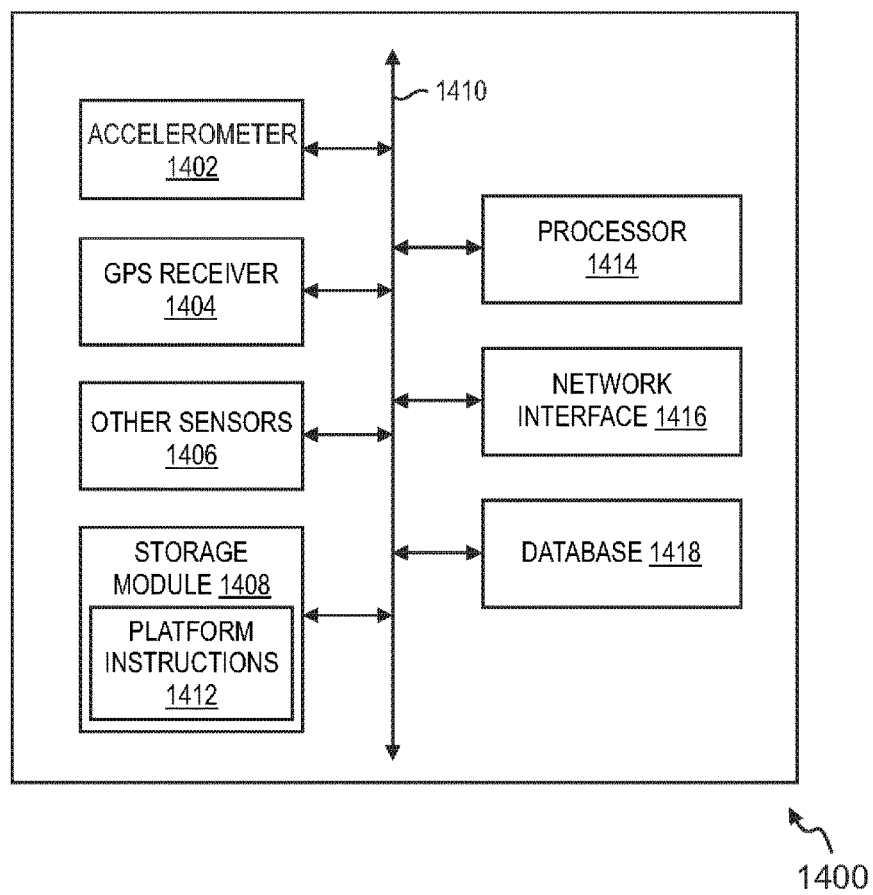
FIG. 14 illustrates a block diagram of an apparatus for localizing a smartphone in a moving vehicle in accordance with an example embodiment of the present disclosure.

FIG. 14 illustrates a block diagram of an apparatus or a system 1400 for localizing a smartphone in a moving vehicle in accordance with an example embodiment of the present disclosure. In some forms, the system 1400 may be a standalone system installed within the vehicle that is communicably coupled to the smartphone. Alternatively or additionally, the system 1400 may completely or partially be embodied within the smartphone or may be composed of components of the smartphone itself in addition to one or more software applications installed on the smartphone. The apparatus 1400 may include an accelerometer 1402, a GPS receiver 1404, one or more other sensors 1406, a processor 1414, a network interface 1416, a database 1418 and a storage module 1408. The one or more other sensors 1406 may include, such as, but not limited to, a gyroscope, a magnetometer, a microphone, a camera, a light sensor, a temperature sensor, an altitude sensor, a proximity sensor, a compass and the like. It is noted that although the apparatus 1400 is depicted to include only one processor 1414, it may include more number of processors therein. In an embodiment, the storage module 1408 is capable of storing machine executable instructions, referred to herein as platform instructions 1412. Further, the processor 1414 is capable of executing the platform instructions 1412. In an embodiment, the processor 1414 may be embodied as a multi-core processor, a single core processor, or a combination of one or more multi-core processors and one or more single core processors. For example, the processor 1414 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 1414 may be configured to execute hard-coded functionality. In an embodiment, the processor 1414 is embodied as an executor of software instructions, wherein the instructions may specifically configure the processor to perform the algorithms and/or operations described herein when the instructions are executed.

The storage module 1408 may be embodied as one or more volatile memory devices, one or more non-volatile memory devices, and/or a combination of one or more volatile memory devices and non-volatile memory devices. For example, the storage module 1408 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The database 1418 may be embodied as a non-volatile storage location capable of storing data such as data related to identification information of the driver 102 such as the name, contact number, address etc., the plurality of coordinates of the smartphone 110 as detected by the one or more sensors of the smartphone 110, lane marking information associated with the region around the vehicle 104, and the like. The processor 1414 may access the stored data from the database 1418 from time to time for determining location related information of the smartphone 110 in the vehicle 104.

The apparatus 1400 may include at least one network interface, such as the network interface 1416. Examples of the network interface 1416 may include wired networks, wireless networks or a combination thereof. Some examples of the wired networks may include Ethernet, local area network (LAN), fiber-optic cable network and the like. Some examples of the wireless networks may include cellular networks like GSM/3G/4G/CDMA networks, wireless LAN, Bluetooth or Zigbee networks and the like. An example of the combination of wired and wireless networks may include the Internet. The network interface 1416 may operatively be coupled to one or more processors, such as a microcontroller, microprocessor, application specific integrated circuit, digital signal processor (DSP), programmable logic circuit, or other data processing device. In various embodiments, the apparatus 1400 may independently execute locally stored applications. The various components of the apparatus 1400, such as the processor 1414, the database 1418, the storage module 1408, the accelerometer 1402, the GPS receiver 1404, the other sensors 1406, and the network interface 1416 are communicatively associated with each other via a bus 1410. In an example embodiment, the bus 1410 is a centralized circuit system. In another example embodiment, the bus 1410 may be any one of a data bus, a control bus, an address bus, a serial bus, a bi-directional bus and the like.

The accelerometer 1402 may be a single axis accelerometer or a multi-axis accelerometer. In some embodiments, the accelerometer 1402 may be implemented as a micro electromechanical system (MEMS) device embedded in the smartphone 110. The accelerometer 1402 may measure acceleration due to gravity.

The GPS receiver 1404 may provide the location of the smartphone 110 in 3-dimensional coordinates (e.g., latitude, longitude, and altitude). The GPS receiver 1404 may continuously send the updated GPS information to the smartphone 110 which in turn may send it further to the server 124 for computations. In some embodiments, the smartphone 110 may use input from the GPS receiver 1404 to determine whether the car 104 is moving or stationary. For example, the smartphone 110 may receive first location coordinates from the GPS receiver 1404 and after a certain period of time may receive second location coordinates. If the difference between the first location and the second location is more than a predefined threshold, e.g., 100 feet, it may be determined that the vehicle 104 is moving. In various embodiments, the smartphone 110 may use other types of location detection sensors such as cell phone towers, Wi-Fi hotspots, etc. to determine its location.

The processor 1414 may be configured to receive inputs from the accelerometer 1402, the GPS receiver 1404 and the other sensors 1406 to calculate (partially/fully) the position of the smartphone 110 in the vehicle 104. The processor 1414 may also be configured to communicate with the one or more external sensors that may be separately mounted at various places of the vehicle 104 to receive the data related to the location and acceleration of the vehicle 104 and/or the smartphone 110. The processor 1414 may be configured to calculate the instantaneous angle of elevation e with respect to the ground surface 1202 when the vehicle 104 is passing over the road discontinuity 1204. The processor 1414 may include various sensor signal interpretation algorithms to determine one or more events such as sudden braking, lane change, zigzag driving, hard acceleration, cornering, distraction of the driver 102, and the like. Further, the processor 1414 may include Iterative Closest Point (ICP) algorithm for geometric alignment of 3-dimensional data points. The processor 1414 may include one or more image processing algorithms to mark lane dividers on the one or more aerial view images obtained for the region around the vehicle 104 and for computing the pixel-wise distance between any two pints directly.

In an embodiment, the processor 1414 may transmit such information related to acceleration and location of the vehicle 104 and/or the smartphone 110 to a remote server such as the server 124 of FIG. 1 to remotely locate the position of the smartphone 110 in the vehicle 104. In an embodiment, the various components of the apparatus 1400 may be implemented using hardware, software, firmware or any combination thereof. It is noted that the apparatus 1400 may include fewer or more components than those depicted in FIG. 14. Moreover, it is understood that though the apparatus 1400 is depicted to include a plurality of components, in some example embodiments, the apparatus 1400 may be implemented using a processor such as the processor 1414, which in conjunction with a storage module, such as the storage module 1408 is configured to perform the various functionalities executed by the plurality of components as explained hereinabove.

Moreover, the apparatus 1400 may be implemented as a centralized system, or, alternatively, the various components of the apparatus 1400 may be deployed in a distributed manner while being operatively coupled to each other. In an embodiment, the apparatus 1400 may be deployed as a platform with one or more components of the apparatus 1400 implemented as a set of software layers on top of existing hardware systems. In an embodiment, the apparatus 1400 may be a standalone component in a remote machine connected to one or more communication networks and capable of executing a set of instructions. In at least one embodiment, the various components of the apparatus 1400 are configured to localize the smartphone 110 in the vehicle 104.

Figure 15:
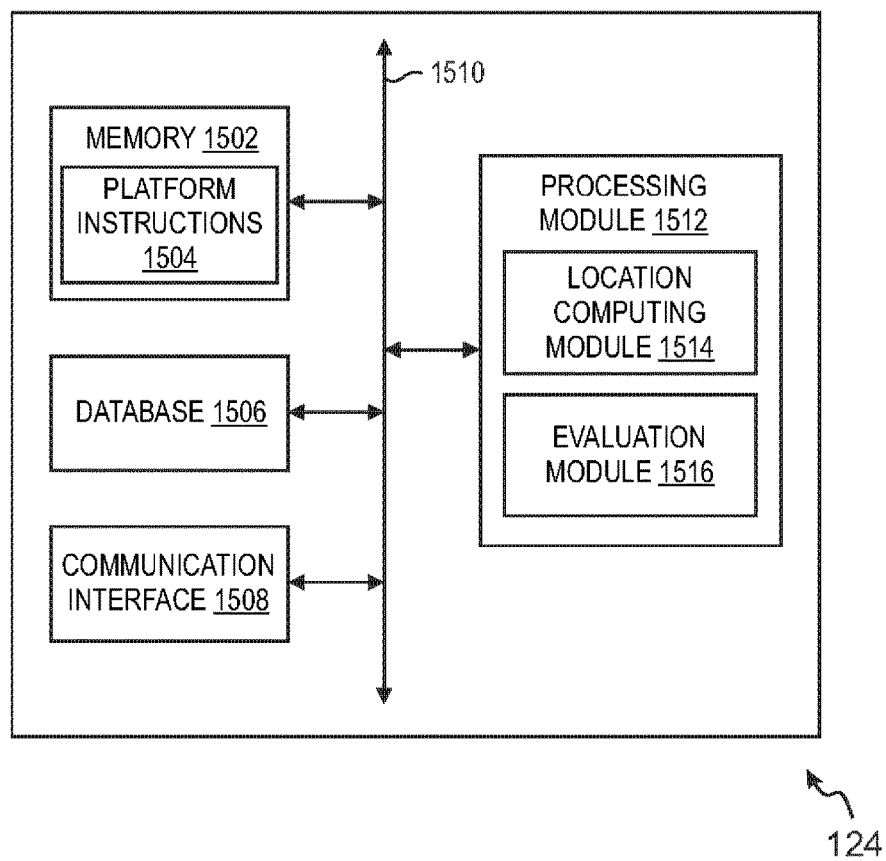
FIG. 15 illustrates a block diagram of a server computing driver identification in accordance with an example embodiment of the present disclosure.

FIG. 15 illustrates a block diagram of a server 124 computing driver identification in accordance with an example embodiment of the present disclosure. The server 124 includes a communication interface 1508, a processing module 1512, a memory 1502, and a database 1506. The processing module 1512 further optionally includes a location computing module 1514 and an evaluation module 1516. The various components of the server 124, such as the processing module 1512, the database 1506, the memory 1502, and the communication interface 1508 are communicatively associated with each other via a bus 1510. In an example embodiment, the bus 1510 is a centralized circuit system. In another example embodiment, the bus 1510 may be any one of a data bus, a control bus, an address bus, a serial bus, a bi-directional bus and the like. In an embodiment, the memory 1502 is capable of storing machine executable instructions, hereinafter referred to as platform instructions 1504. Further, the processing module 1512 is capable of executing the platform instructions 1504. In an embodiment, the processing module 1512 may be embodied as a multi-core processor, a single core processor, or a combination of one or more multi-core processors and one or more single core processors. In an embodiment, the processing module 1512 may be configured to execute hard-coded functionality. In an embodiment, the processing module 1512 is embodied as an executor of software instructions, wherein the instructions may specifically configure the processing module 1512 to perform the algorithms and/or operations described herein when the instructions are executed.

The memory 1502 may be embodied as one or more volatile memory devices, one or more non-volatile memory devices, and/or a combination of one or more volatile memory devices and non-volatile memory devices. For example, the memory 1502 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R'W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The database 1506 may be embodied as a non-volatile storage location capable of storing data such as data/information related to the plurality of coordinates associated with the smartphone 110 and/or the vehicle 104 (as sensed by the one or more sensors of the apparatus 1400 and as transmitted by the apparatus 1400 to the server 124), the data related to one or more digital maps databases such as Google maps (to retrieve the lane marking information), updated location information of the smartphone 110 computed on a periodic basis, a plurality of driver deterministic characteristics, information related to insurance companies or fleet owners or authorized relatives of the driver 102 to receive notifications regarding driver's driving behavior and the like. The processing module 1512 may access the stored data from the database 1506 from time to time for localizing the smartphone 110 and/or for identifying the driver 102.

The server 124 may also include at least one communication interface such as the communication interface 1508. The communication interface 1508 may include a transceiver circuitry including antenna and other communication media interfaces to connect to a wired and/or wireless communication network, such as the network 122 of FIG. 1. The examples of wired communication networks may include Ethernet, local area network (LAN), fiber-optic cable network and the like. Some examples of the wireless networks may include cellular networks like GSM/3G/4G/CDMA networks, wireless LAN, Bluetooth, Wi-Fi or Zigbee networks and the like. An example of the combination of wired and wireless networks may include the Internet. In various embodiments, the remote server 124 may independently execute locally stored applications. The communication circuitry, in at least some example embodiments, may enable transmission of data signals and/or reception of signals to and/or from remote network entities, such as the apparatus 1400, (the one or more sensors externally mounted in the vehicle 104, optionally), the smartphone 110, etc. as explained with reference to FIG. 1

The processing module 1512, in conjunction with the location computing module 1514 may be configured to determine the location of the smartphone 110 in the stationary or the moving vehicle 104. The location computing module 1514 may include one or more algorithms to calculate the lateral, the longitudinal and the vertical position of the smartphone 110 in the vehicle 104 using the location and the acceleration coordinates transmitted by the apparatus 1400. The location computing module 1514 may further be configured to construct a 4D plot of the probability densities using the marginal probabilities of likelihood of the smartphone 110 along all three axes. Further, the most likely position of the smartphone 110 may be inferred from the 3-dimensional histogram.

The processing module 1512, in conjunction with the evaluation module 1516 may be configured to perform driver identification using the location of the smartphone 110 inside the vehicle 104. The evaluation module 1516 may utilize the one or more deterministic characteristics related to the driver 102 as stored in the database 1506 along with the location of the smartphone 110 to identify if the driver 102 is driving the vehicle 104. For example, if the location computing module 1514 determines the location of the smartphone 110 to be as mounted on the windshield 120 of the vehicle 104 towards the First-Left seat 106, and if a navigation application is running on the smartphone 110 at the same time, this combined information may be used by one or more algorithms of the evaluation module 1516 to determine that the driver 102 is driving the vehicle 104.

In an example embodiment, the evaluation module 1516 may be configured to perform data analytics received from the apparatus. Examples of analytics include driving scores that take into account key performance indicators (KPIs) or driver 102 performance indicators (DPIs) of interest, driving behaviour on a short term and long term, driving behaviour change, and the like. In various embodiments, the processing module 1512 may be configured to communicate the driver identification information to a third party device or to one or more entities such as the insurance companies using the communication interface 1508 which may then become capable to determine the premium value of the auto insurance more effectively. The aberrant behaviour may also be communicated to the authorized relatives of the driver 102 through a notification such as a text message or an email.

In various embodiments, the server 124 may perform one or more discrete functions such as localizing the smartphone 110 in the vehicle 104 and identifying the driver 102. In another embodiment, the server 124 may serve as redundant fail-over servers for these different discrete functions. In some embodiments, the server 124 may be a physical computer or one or more cluster of computers while in other embodiments, it may be virtualized server 124 running on one or more physical computers under the control of a virtual machine provider. In yet another embodiment, the server 124 may be allocated according to processor cycles and storage requirements rather than according to a number of computers. Further, the processing module 1512 of the server 124 may be configured to perform operations without being dependent on the data being processed locally in the vehicle 104. In an example embodiment, the server 124 may have partial operations to be performed wherein the data may be partially processed locally in the vehicle 104 and the processed data is further processed by the one or more components of the server 124. Any variation it terms of functionalities performed at either the vehicle 104 or the server 124 is within scope of this description.

Figure 16:
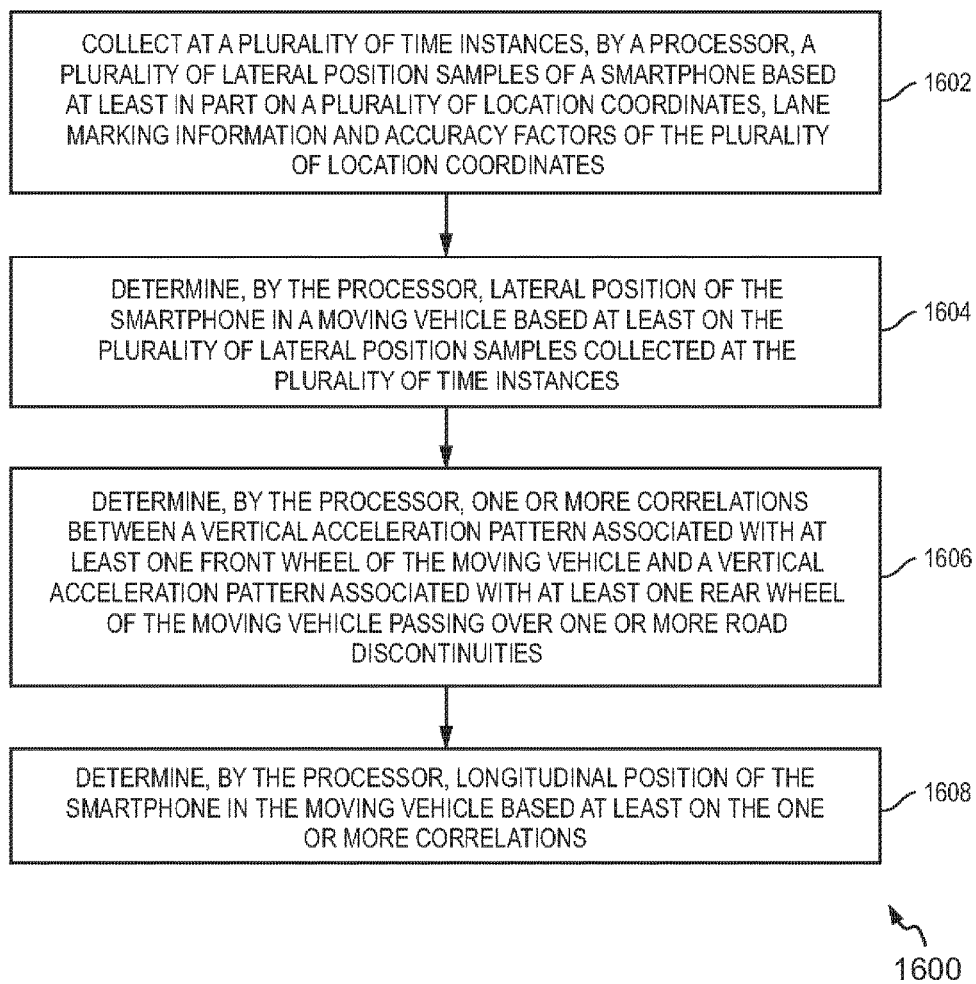
FIG. 16 illustrates a method for localizing a smartphone in a moving vehicle in accordance with an example embodiment of the present disclosure.

FIG. 16 illustrates a method 1600 for localizing a smartphone in a moving vehicle in accordance with an example embodiment of the present disclosure. The various steps and/or operations of the method 1600, and combinations of steps/operations in the flow diagram, may be implemented by, for example, using the apparatus 1400, the smartphone 110, the server 124 or by a combination thereof. The method starts at 1602.

At 1602, a plurality of lateral position samples of a smartphone based at least in part on a plurality of location coordinates, lane marking information and accuracy factors of the plurality of location coordinates are collected at a plurality of time instances.

At 1604, lateral position of the smartphone in a moving vehicle based at least on the plurality of lateral position samples collected at the plurality of time instances is determined.

At 1606, one or more correlations between a vertical acceleration pattern associated with at least one front wheel of the moving vehicle and a vertical acceleration pattern associated with at least one rear wheel of the moving vehicle passing over one or more road discontinuities are determined. The vertical acceleration pattern associated with the at least front wheel and vertical acceleration pattern associated with the at least rear wheel are computed from an accelerometer sensor present in the smartphone.

At 1608, longitudinal position of the smartphone in the moving vehicle based at least on the one or more correlations is determined. The method ends at step 1608.

Various example embodiments disclosed herein provide numerous advantages. The apparatuses and methods disclosed herein enable localization of the smartphone 110 in the moving vehicle 104 and use of the same to identify driver 102 of the vehicle 104 more efficiently. The integrity of the data used for driver monitoring is improved through the combined use of location of the smartphone 110 and one or more deterministic characteristics of the driver's behaviour information. The quality of output data is related to gaining better insights into driver behaviour/characterization in terms of risk profile, rash driving, tailgating and the like and using such information optionally by the insurance companies to determine or modify the premium value of the auto insurance. Moreover, techniques disclosed herein suggest multiple approaches to find lateral, longitudinal and vertical position of the smartphone 110 inside the vehicle 104 which provides added accuracy to the location determination. Further, techniques disclosed herein are capable of locating multiple smartphones present in the vehicle 104 and determining respective owner of all the phones i.e. driver 102 or passengers.

The present disclosure is described above with reference to block diagrams and flowchart illustrations of method and apparatus embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of an apparatus described and depicted in FIG. 14. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

We claim:

1. A method for localizing a smartphone in a moving vehicle, the method comprising:
   collecting at a plurality of time instances, by a processor, a plurality of lateral position samples of the smartphone based at least in part on a plurality of location coordinates, lane marking information and accuracy factors of the plurality of location coordinates;
   determining, by the processor, a lateral position of the smartphone in the moving vehicle based at least on the plurality of lateral position samples collected at the plurality of time instances;
   determining, by the processor, one or more correlations between a vertical acceleration pattern associated with at least one front wheel of the moving vehicle and a vertical acceleration pattern associated with at least one rear wheel of the moving vehicle passing over one or more road discontinuities, the vertical acceleration pattern associated with the at least front wheel and vertical acceleration pattern associated with the at least rear wheel computed from an accelerometer sensor present in the smartphone; and
   determining, by the processor, a longitudinal position of the smartphone in the moving vehicle based at least on the one or more correlations.

2. The method as claimed in claim 1, wherein determining the longitudinal position further comprises:
   determining a first instantaneous angle of elevation of the at least one front wheel with respect to a ground surface when the at least one front wheel passes over a road discontinuity of the one or more road discontinuities;
   determining a second instantaneous angle of elevation of the at least one rear wheel with respect to the ground surface when the at least one rear wheel passes over the road discontinuity;
   determining a first vertical acceleration of the smartphone when the at least one front wheel passes over the road discontinuity;
   determining a second vertical acceleration of the smartphone when the at least one rear wheel passes over the road discontinuity; and
   determining the longitudinal position of the smartphone with respect to a reference point in the moving vehicle based on the first instantaneous angle of elevation, the second instantaneous angle of elevation, the first vertical acceleration and the second vertical acceleration.

3. The method as claimed in claim 2, further comprising determining a vertical position of the smartphone based at least on the first instantaneous angle of elevation, the second instantaneous angle of elevation, the first vertical acceleration and the second vertical acceleration.

4. The method as claimed in claim 3, further comprising:
   generating a three-dimensional histogram of the lateral position, the longitudinal position and the vertical position of the smartphone to localize the smartphone in the moving vehicle.

5. The method as claimed in claim 1, wherein determining the lateral position of the smartphone is further based at least on a plurality of acceleration values of the smartphone in a vehicle coordinate system.

6. The method as claimed in claim 5, wherein the plurality of acceleration values of the smartphone in a vehicle coordinate system is obtained by transforming a plurality of acceleration values of the smartphone in a smartphone coordinate system using a rotation matrix, wherein the rotation matrix is updated based on changes in at least one of a pitch, a roll and an azimuth associated with the smartphone in the moving vehicle.

7. The method as claimed in claim 1, wherein determining the lateral position of the smartphone further comprises:
   marking at least two points closest to the moving vehicle on corresponding lanes using the lane marking information and the plurality of location coordinates;
   collecting the plurality of lateral position samples of the smartphone within the at least two marked points with reference to a center of the lane;
   generating a weighted histogram of the plurality of lateral position samples of the smartphone, wherein weight assigned to each sample position of the smartphone is inversely proportional to the accuracy factors of the plurality of location coordinates of the moving vehicle; and
   selecting an optimum value as the lateral position of the smartphone from the weighted histogram.

8. The method as claimed in claim 1, wherein the plurality of lateral position samples of the smartphone for a vehicular path on a curved lane is computed by determining a plurality of relative positions of the moving vehicle with respect to radius of curvature of the vehicular path obtained as a function of speed and a plurality of acceleration values of the smartphone in a vehicle coordinate system, and radius of a curved lane closest to the vehicle obtained based on the lane marking information.

9. The method as claimed in claim 1, wherein determining the longitudinal position of the smartphone further comprises:
   comparing a correlation between the vertical acceleration pattern associated with the at least one front wheel and the vertical acceleration pattern associated with the at least one rear wheel to a threshold correlation value; and
   upon the correlation being greater than the threshold correlation value, estimating a longitudinal position sample based on a standard deviation of the vertical acceleration pattern associated with the at least one front wheel and a standard deviation of the vertical acceleration pattern associated with the at least one rear wheel.

10. The method as claimed in claim 9, wherein determining the longitudinal position of the smartphone further comprises:
    generating a histogram based on estimating the longitudinal position sample for each of the one or more road discontinuities; and
    selecting an optimum value as the longitudinal position of the smartphone from the histogram.

11. The method as claimed in claim 1, wherein the one or more road discontinuities further comprises any of a bridge along a road, a joint to connect columns of a flyover, one or more potholes and one or more speed breakers.

12. The method as claimed in claim 1, wherein the lane marking information is received from one or more aerial view images obtained around a region of the moving vehicle, the one or more aerial view images comprising any of one or more lane markers, the one or more road discontinuities, one or more lane dividers, one or more curved lanes, one or more medians, a lane center, one or more road borders, or one or more markers to separate multiple lanes of the region around the moving vehicle.

13. A system for localizing a smartphone in a moving vehicle, the system comprising:

at least one processor; and
  a memory having stored therein machine executable instructions, that when executed by the at least one processor, cause the system to:
    collect at a plurality of time instances, a plurality of lateral position samples of the smartphone based at least in part on a plurality of location coordinates, lane marking information and accuracy factors of the plurality of location coordinates;
    determine a lateral position of the smartphone in the moving vehicle based at least on the plurality of lateral position samples collected at the plurality of time instances;
    determine one or more correlations between a vertical acceleration pattern associated with at least one front wheel of the moving vehicle and a vertical acceleration pattern associated with at least one rear wheel of the moving vehicle passing over one or more road discontinuities, the vertical acceleration pattern associated with the at least front wheel and vertical acceleration pattern associated with the at least rear wheel computed from an accelerometer sensor present in the smartphone; and
    determine a longitudinal position of the smartphone in the moving vehicle based at least on the one or more correlations.

14. The system as claimed in claim 13, wherein for determining the longitudinal position, the system is further caused to:
  determine a first instantaneous angle of elevation of the at least one front wheel with respect to a ground surface when the at least one front wheel passes over a road discontinuity of the one or more road discontinuities;
  determine a second instantaneous angle of elevation of the at least one rear wheel with respect to the ground surface when the at least one rear wheel passes over the road discontinuity;
  determine a first vertical acceleration of the smartphone when the at least one front wheel passes over the road discontinuity;
  determine a second vertical acceleration of the smartphone when the at least one rear wheel passes over the road discontinuity; and
  determine the longitudinal position of the smartphone with respect to a reference point in the moving vehicle based on the first instantaneous angle of elevation, the second instantaneous angle of elevation, the first vertical acceleration and the second vertical acceleration.

15. The system as claimed in claim 14, wherein the system is further caused to:
  determine a vertical position of the smartphone based at least on the first instantaneous angle of elevation, the second instantaneous angle of elevation and the first vertical acceleration, the second vertical acceleration.

16. The system as claimed in claim 15, wherein the system is further caused to:
  generate a three-dimensional histogram of the lateral, the longitudinal and the vertical position of the smartphone to localize the smartphone in the moving vehicle.

17. The system as claimed in claim 13, wherein the system is further caused to:
  determine the lateral position of the smartphone based at least on a plurality of acceleration values of the smartphone in a vehicle coordinate system.

18. The system as claimed in claim 17, wherein the plurality of acceleration values of the smartphone in a vehicle coordinate system is obtained by transforming a plurality of acceleration values of the smartphone in a smartphone coordinate system using a rotation matrix, wherein the rotation matrix is updated based on changes in at least one of a pitch, a roll and an azimuth associated with the smartphone in the moving vehicle.

19. The system as claimed in claim 13, wherein for determining the lateral position of the smartphone, the system is further caused to:
  mark at least two points closest to the moving vehicle on corresponding lanes using the lane marking information and the plurality of location coordinates;
  collect the plurality of lateral position samples of the smartphone within the at least two marked points with reference to a center of the lane;
  generate a weighted histogram of the plurality of lateral position samples of the smartphone, wherein weight assigned to each sample position of the smartphone is inversely proportional to the accuracy factors of the plurality of location coordinates of the moving vehicle; and
  select an optimum value as the lateral position of the smartphone from the weighted histogram.

20. The system as claimed in claim 13, wherein the plurality of lateral position samples of the smartphone for a vehicular path on a curved lane is computed by determining a plurality of relative positions of the moving vehicle with respect to radius of curvature of the vehicular path obtained as a function of speed and a plurality of acceleration values of the smartphone in a vehicle coordinate system, and radius of a curved lane closest to the vehicle obtained based on the lane marking information.

21. The system as claimed in claim 13, wherein for determining the longitudinal position of the smartphone, the system is further caused to:
  compare a correlation between the vertical acceleration pattern associated with the at least one front wheel and the vertical acceleration pattern associated with the at least one rear wheel to a threshold correlation value; and
  upon the correlation being greater than the threshold correlation value, estimate a longitudinal position sample based on a standard deviation of the vertical acceleration pattern associated with the at least one front wheel and a standard deviation of the vertical acceleration pattern associated with the at least one rear wheel.

22. The system as claimed in claim 21, wherein for determining the longitudinal position of the smartphone, the system is further caused to:
  generate a histogram based on estimating the longitudinal position sample for each of the one or more road discontinuities; and
  select an optimum value as the longitudinal position of the smartphone from the histogram.

23. The system as claimed in claim 13, wherein the lane marking information is received from one or more aerial view images obtained around a region of the moving vehicle, the one or more aerial view images comprising any of one or more lane markers, the one or more road discontinuities, one or more lane dividers, one or more curved lanes, one or more medians, a lane center, one or more road borders, or one or more markers to separate multiple lanes of the region around the moving vehicle.

* * * * *